US010776435B2

(12) United States Patent
Vaish et al.

(10) Patent No.: US 10,776,435 B2
(45) Date of Patent: Sep. 15, 2020

(54) CANONICALIZED ONLINE DOCUMENT SITELINK GENERATION

(71) Applicant: Google Inc., Mountain View, CA (US)

(72) Inventors: Vaibhav Vaish, Mountain View, CA (US); Venky Ramachandran, Cupertino, CA (US); David Philip Sisson, Fremont, CA (US); Ramakrishnan Kandhan, Mountain View, CA (US); Pramod Adiddam, Mountain View, CA (US); Vinod Ramachandran Marur, Palo Alto, CA (US); Gaurav Garg, Mountain View, CA (US)

(73) Assignee: Google LLC, Mountain View, CA (US)

( * ) Notice: Subject to any disclaimer, the term of this patent is extended or adjusted under 35 U.S.C. 154(b) by 50 days.

(21) Appl. No.: 15/491,734

(22) Filed: Apr. 19, 2017

(65) Prior Publication Data

US 2017/0220694 A1    Aug. 3, 2017

Related U.S. Application Data

(63) Continuation of application No. 13/840,380, filed on Mar. 15, 2013.
(Continued)

(51) Int. Cl.
*G06F 17/00* (2019.01)
*G06F 16/9535* (2019.01)
*G06F 16/93* (2019.01)

(52) U.S. Cl.
CPC .......... *G06F 16/9535* (2019.01); *G06F 16/93* (2019.01)

(58) Field of Classification Search
CPC combination set(s) only.
See application file for complete search history.

(56) References Cited

U.S. PATENT DOCUMENTS 5,675,788 A   10/1997  Husick et al.
5,724,521 A    3/1998  Dedrick
(Continued)

FOREIGN PATENT DOCUMENTS

EP   1 271 458   1/2003
EP   1 286 288   2/2003
(Continued)

OTHER PUBLICATIONS

Probabilistic models for focused Web crawling—Hongyu Liu—2007 (Year: 2007).*
(Continued)

*Primary Examiner* — Gautam Ubale
(74) *Attorney, Agent, or Firm* — Foley & Lardner LLP; James De Vellis

(57) ABSTRACT

Methods and systems for improved processor efficiency via reductions in repeated calculations are provided. A plurality of candidate sitelinks are identified in response to a search for online content. Each sitelink has associated with it a plurality of candidate creatives with which the sitelink may be presented to the user. The creatives are canonicalized to form clusters of candidate creatives. The sitelinks are also canonicalized. The creatives are matched to the candidate canonicalized sitelinks so as to provide enhanced sitelinks having increased relevance to the user search.

18 Claims, 8 Drawing Sheets

Related U.S. Application Data

(60) Provisional application No. 61/758,979, filed on Jan. 31, 2013.

(56) References Cited

U.S. PATENT DOCUMENTS

| | | |
|---|---|---|
| 5,740,549 A | 4/1998 | Reilly et al. |
| 5,749,069 A | 5/1998 | Komori et al. |
| 5,848,397 A | 12/1998 | Marsh et al. |
| 5,850,433 A | 12/1998 | Rondeau |
| 5,930,773 A | 7/1999 | Crooks et al. |
| 5,948,061 A | 9/1999 | Merriman et al. |
| 6,026,368 A | 2/2000 | Brown et al. |
| 6,044,376 A | 3/2000 | Kurtzman, II |
| 6,078,914 A | 6/2000 | Redfern |
| 6,088,688 A | 7/2000 | Crooks et al. |
| 6,125,284 A | 9/2000 | Moore et al. |
| 6,144,944 A | 11/2000 | Kurtzman et al. |
| 6,167,382 A | 12/2000 | Sparks et al. |
| 6,189,003 B1 | 2/2001 | Leal |
| 6,259,127 B1 | 7/2001 | Pan |
| 6,259,405 B1 | 7/2001 | Stewart et al. |
| 6,269,361 B1 | 7/2001 | Davis et al. |
| 6,275,806 B1 | 8/2001 | Pertrushin |
| 6,332,127 B1 | 12/2001 | Bandera et al. |
| 6,401,075 B1 | 6/2002 | Mason et al. |
| 6,446,045 B1 | 9/2002 | Stone et al. |
| 6,600,930 B1 | 7/2003 | Sakurai et al. |
| 6,647,257 B2 | 11/2003 | Owensby |
| 6,665,293 B2 | 12/2003 | Thornton et al. |
| 6,677,894 B2 | 1/2004 | Sheynblat et al. |
| 6,684,249 B1 | 1/2004 | Frerichs et al. |
| 6,731,612 B1 | 5/2004 | Koss |
| 6,857,007 B1 | 2/2005 | Bloomfield |
| 6,956,816 B1 | 10/2005 | Alexander et al. |
| 6,985,882 B1 | 1/2006 | Del Sesto |
| 7,016,343 B1 | 3/2006 | Mermel et al. |
| 7,039,599 B2 | 5/2006 | Merriman et al. |
| 7,120,235 B2 | 10/2006 | Altberg et al. |
| 7,136,875 B2 | 11/2006 | Anderson et al. |
| 7,240,025 B2 | 7/2007 | Stone et al. |
| 7,376,640 B1 | 5/2008 | Anderson et al. |
| 7,406,434 B1 | 7/2008 | Chang et al. |
| 7,613,637 B2 | 11/2009 | Chan et al. |
| 7,668,950 B2 | 2/2010 | Horowitz et al. |
| 7,853,255 B2 | 12/2010 | Karaoguz et al. |
| 7,881,936 B2 | 2/2011 | Longe et al. |
| 7,904,460 B2 | 3/2011 | Armour et al. |
| 7,920,682 B2 | 4/2011 | Byrne et al. |
| 8,041,709 B2 | 10/2011 | Permandla et al. |
| 8,068,604 B2 | 11/2011 | Leeds et al. |
| 8,108,383 B2 | 1/2012 | Lin et al. |
| 8,175,914 B1 | 5/2012 | Benson et al. |
| 8,195,133 B2 | 6/2012 | Ramer et al. |
| 8,204,881 B2 | 6/2012 | Holt et al. |
| 8,214,342 B2 | 7/2012 | Meiresonne |
| 8,234,275 B2 | 7/2012 | Grant et al. |
| 8,312,014 B2 | 11/2012 | Lu et al. |
| 8,326,637 B2 | 12/2012 | Baldwin et al. |
| 8,386,386 B1 | 2/2013 | Zhu |
| 8,453,058 B1 | 5/2013 | Coccaro et al. |
| 8,612,226 B1 | 12/2013 | Epstein et al. |
| 8,762,156 B2 | 6/2014 | Chen |
| 8,903,716 B2 | 12/2014 | Chen et al. |
| 9,275,637 B1 | 3/2016 | Salvador et al. |
| 9,318,107 B1 | 4/2016 | Sharifi |
| 9,424,841 B2 | 8/2016 | Foerster et al. |
| 9,431,006 B2 | 8/2016 | Bellegarda |
| 9,542,941 B1 | 1/2017 | Weksler et al. |
| 9,653,075 B1 | 5/2017 | Chen et al. |
| 10,032,452 B1 | 7/2018 | Bhaya et al. |
| 10,165,091 B1 | 12/2018 | Bittfield et al. |
| 10,193,465 B2 | 1/2019 | Dai et al. |
| 10,535,348 B2 | 1/2020 | Bhaya et al. |
| 2001/0020236 A1 | 9/2001 | Cannon |
| 2001/0025275 A1 | 9/2001 | Tanaka et al. |
| 2002/0029226 A1 | 3/2002 | Li et al. |
| 2002/0042829 A1 | 4/2002 | Mizuhara et al. |
| 2002/0077130 A1 | 6/2002 | Owensby |
| 2002/0082938 A1 | 6/2002 | Borger et al. |
| 2002/0091571 A1 | 7/2002 | Thomas et al. |
| 2002/0128908 A1 | 9/2002 | Levin et al. |
| 2002/0161646 A1 | 10/2002 | Gailey et al. |
| 2002/0164977 A1 | 11/2002 | Link, II et al. |
| 2002/0188680 A1 | 12/2002 | McCormack et al. |
| 2003/0008661 A1 | 1/2003 | Joyce et al. |
| 2003/0018479 A1 | 1/2003 | Oh et al. |
| 2003/0028529 A1 | 2/2003 | Cheung et al. |
| 2003/0032406 A1 | 2/2003 | Minear et al. |
| 2003/0032409 A1 | 2/2003 | Hutcheson et al. |
| 2003/0033079 A1 | 2/2003 | Endicott |
| 2003/0033292 A1 | 2/2003 | Meisel et al. |
| 2003/0046161 A1 | 3/2003 | Kamangar et al. |
| 2003/0061211 A1 | 3/2003 | Shultz et al. |
| 2003/0105677 A1 | 6/2003 | Skinner |
| 2003/0125977 A1 | 7/2003 | Morioka et al. |
| 2003/0154072 A1 | 8/2003 | Young et al. |
| 2003/0220835 A1 | 11/2003 | Barnes, Jr. |
| 2004/0023666 A1 | 2/2004 | Moon et al. |
| 2004/0030556 A1 | 2/2004 | Bennett |
| 2004/0043770 A1 | 3/2004 | Amit et al. |
| 2004/0044565 A1 | 3/2004 | Kumar et al. |
| 2004/0044571 A1 | 3/2004 | Bronnimann et al. |
| 2004/0059712 A1 | 3/2004 | Dean et al. |
| 2004/0076279 A1 | 4/2004 | Taschereau |
| 2004/0083133 A1 | 4/2004 | Nicholas et al. |
| 2004/0085894 A1 | 5/2004 | Wang et al. |
| 2004/0120323 A1 | 6/2004 | Viikari et al. |
| 2004/0172389 A1 | 9/2004 | Galai et al. |
| 2004/0220778 A1 | 11/2004 | Imai et al. |
| 2005/0027659 A1 | 2/2005 | Kumar et al. |
| 2005/0065999 A1 | 3/2005 | Acharya et al. |
| 2005/0074102 A1 | 4/2005 | Altberg et al. |
| 2005/0076017 A1 | 4/2005 | Rein et al. |
| 2005/0086104 A1 | 4/2005 | McFadden |
| 2005/0097204 A1 | 5/2005 | Horowitz et al. |
| 2005/0137939 A1 | 6/2005 | Calabria et al. |
| 2005/0144065 A1 | 6/2005 | Calabria et al. |
| 2005/0144069 A1 | 6/2005 | Wiseman et al. |
| 2005/0187823 A1* | 8/2005 | Howes .................. G06Q 30/02 705/14.58 |
| 2005/0225810 A1 | 10/2005 | Sun |
| 2005/0234879 A1 | 10/2005 | Zeng et al. |
| 2006/0004627 A1* | 1/2006 | Baluja ................ H04M 3/4878 705/14.4 |
| 2006/0149624 A1 | 7/2006 | Baluja et al. |
| 2006/0190974 A1 | 8/2006 | Lee |
| 2006/0195819 A1 | 8/2006 | Chory et al. |
| 2006/0247913 A1 | 11/2006 | Huerta et al. |
| 2006/0274869 A1 | 12/2006 | Morse |
| 2006/0287919 A1 | 12/2006 | Rubens et al. |
| 2007/0005570 A1* | 1/2007 | Hurst-Hiller ........... G10L 15/26 |
| 2007/0088609 A1 | 4/2007 | Reller et al. |
| 2007/0097975 A1 | 5/2007 | Rakers et al. |
| 2007/0100822 A1 | 5/2007 | Freeman et al. |
| 2007/0127688 A1 | 6/2007 | Doulton |
| 2007/0282612 A1 | 12/2007 | Kaneko et al. |
| 2007/0294229 A1 | 12/2007 | Au |
| 2008/0021604 A1 | 1/2008 | Bouvier et al. |
| 2008/0049696 A1 | 2/2008 | Stewart |
| 2008/0052219 A1 | 2/2008 | Sandholm et al. |
| 2008/0071536 A1 | 3/2008 | Nagashima |
| 2008/0103781 A1 | 5/2008 | Wasson et al. |
| 2008/0227484 A1 | 9/2008 | Auvray et al. |
| 2008/0228494 A1 | 9/2008 | Cross |
| 2008/0243785 A1 | 10/2008 | Stading |
| 2008/0249855 A1 | 10/2008 | Collins et al. |
| 2008/0270223 A1 | 10/2008 | Collins et al. |
| 2008/0294609 A1* | 11/2008 | Liu ......................... G06Q 30/02 |
| 2008/0305778 A1 | 12/2008 | Aaltonen et al. |
| 2009/0210491 A1 | 8/2009 | Thakkar et al. |
| 2009/0228281 A1 | 9/2009 | Singleton et al. |
| 2009/0240670 A1 | 9/2009 | Tiyyagura et al. |
| 2010/0198772 A1 | 8/2010 | Silverman et al. |
| 2010/0306229 A1 | 12/2010 | Timm et al. |

(56) References Cited

U.S. PATENT DOCUMENTS

| | | | |
|---|---|---|---|
| 2011/0010240 A1 | 1/2011 | Veach | |
| 2011/0014925 A1 | 1/2011 | Antic et al. | |
| 2011/0022460 A1 | 1/2011 | Bhatia et al. | |
| 2011/0087660 A1 | 4/2011 | Yu et al. | |
| 2011/0141925 A1 | 6/2011 | Velenko et al. | |
| 2011/0202494 A1 | 8/2011 | Shin et al. | |
| 2011/0264644 A1 | 10/2011 | Grant et al. | |
| 2011/0295682 A1* | 12/2011 | Liu | G06Q 30/0249 705/14.48 |
| 2011/0295990 A1 | 12/2011 | St. Jean et al. | |
| 2011/0307436 A1 | 12/2011 | Cai et al. | |
| 2011/0320114 A1 | 12/2011 | Buxton et al. | |
| 2012/0016897 A1 | 1/2012 | Tulumbas et al. | |
| 2012/0030015 A1 | 2/2012 | Brunsman et al. | |
| 2012/0036226 A1 | 2/2012 | Chor | |
| 2012/0101776 A1 | 4/2012 | Brower et al. | |
| 2012/0102020 A1 | 4/2012 | Pearson | |
| 2012/0102087 A1 | 4/2012 | Chor | |
| 2012/0138671 A1 | 6/2012 | Gaede et al. | |
| 2012/0155838 A1 | 6/2012 | Gerhards et al. | |
| 2012/0158954 A1 | 6/2012 | Heffernan et al. | |
| 2012/0166277 A1* | 6/2012 | Gnanamani | G06Q 30/02 705/14.49 |
| 2012/0221724 A1 | 8/2012 | Chor | |
| 2012/0265528 A1 | 10/2012 | Gruber et al. | |
| 2012/0297174 A1 | 11/2012 | Frank et al. | |
| 2013/0013749 A1 | 1/2013 | Kane et al. | |
| 2013/0073400 A1 | 3/2013 | Heath | |
| 2013/0117022 A1 | 5/2013 | Chen et al. | |
| 2013/0124606 A1 | 5/2013 | Carpenter et al. | |
| 2013/0144720 A1 | 6/2013 | Hari et al. | |
| 2013/0185074 A1 | 7/2013 | Gruber et al. | |
| 2013/0191226 A1 | 7/2013 | Smallwood et al. | |
| 2013/0275164 A1 | 10/2013 | Gruber et al. | |
| 2013/0304758 A1 | 11/2013 | Gruber et al. | |
| 2013/0304789 A1 | 11/2013 | Herlein | |
| 2013/0325449 A1 | 12/2013 | Levien et al. | |
| 2013/0339030 A1 | 12/2013 | Ehsani et al. | |
| 2014/0074895 A1 | 3/2014 | Ingerman et al. | |
| 2014/0095583 A1 | 4/2014 | Houle | |
| 2014/0115635 A1 | 4/2014 | Mashimo | |
| 2014/0229184 A1 | 8/2014 | Shires | |
| 2014/0337028 A1 | 11/2014 | Wang et al. | |
| 2014/0350938 A1 | 11/2014 | Schroeter | |
| 2015/0081288 A1 | 3/2015 | Kim | |
| 2015/0106085 A1 | 4/2015 | Lindahl | |
| 2015/0221305 A1 | 8/2015 | Sharifi | |
| 2016/0105718 A1 | 4/2016 | Xu et al. | |
| 2016/0180846 A1 | 6/2016 | Lee | |
| 2016/0217790 A1 | 7/2016 | Sharifi | |
| 2016/0223640 A1 | 8/2016 | Vilermo et al. | |
| 2016/0246929 A1 | 8/2016 | Zenati et al. | |
| 2016/0259497 A1 | 9/2016 | Foss et al. | |
| 2017/0069317 A1 | 3/2017 | Kwon | |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0147585 A1 | 5/2017 | Kleindienst et al. | |
| 2017/0289596 A1 | 10/2017 | Krasadakis et al. | |
| 2017/0358301 A1 | 12/2017 | Raitio et al. | |
| 2017/0358302 A1 | 12/2017 | Orr et al. | |
| 2018/0322536 A1 | 11/2018 | Zhang et al. | |

FOREIGN PATENT DOCUMENTS

| | | |
|---|---|---|
| GB | 2 305 747 | 4/1997 |
| JP | 11-065950 | 1/1900 |
| JP | 11-265347 | 9/1999 |
| JP | 2001-236410 | 8/2001 |
| JP | 2001-282982 | 10/2001 |
| JP | 2001-297256 | 10/2001 |
| JP | 2001-312646 | 11/2001 |
| JP | 2001-312649 | 11/2001 |
| JP | 2002-007253 | 1/2002 |
| JP | 2002-016970 | 1/2002 |
| JP | 2002-073666 | 3/2002 |
| JP | 2002-099822 | 4/2002 |
| JP | 2002-132827 | 5/2002 |
| JP | 2002-140359 | 5/2002 |
| JP | 2002-169744 | 6/2002 |
| JP | 2002-170027 | 6/2002 |
| JP | 2002-245048 | 8/2002 |
| JP | 2002-288541 A | 10/2002 |
| JP | 2003-016348 | 1/2003 |
| JP | 2003-122781 | 4/2003 |
| JP | 2003-223591 | 8/2003 |
| JP | 2003-263584 | 9/2003 |
| JP | 2003-337893 | 11/2003 |
| JP | 2004-032037 | 1/2004 |
| JP | 2006-236324 A | 9/2006 |
| JP | 2011-192102 | 3/2010 |
| JP | 2011-192102 | 9/2011 |
| JP | 2013-540306 A | 10/2013 |
| JP | 2015-001815 A | 1/2015 |
| JP | 2016-111406 A | 6/2016 |
| KR | 2000-0054165 A | 9/2000 |
| KR | 200054165 | 9/2000 |
| KR | 2002-69767 | 9/2002 |
| KR | 2003-39736 | 5/2003 |
| KR | 2010-0126796 A | 12/2010 |
| KR | 2015-0097816 A | 8/2015 |
| WO | WO-97/21183 A | 6/1997 |
| WO | WO-00/42544 | 7/2000 |
| WO | WO-01/59546 | 8/2001 |
| WO | WO-01/93138 | 12/2001 |
| WO | WO-2012/094329 | 7/2012 |
| WO | WO-2014/004489 A1 | 1/2014 |
| WO | WO-2015/133022 A1 | 9/2015 |

OTHER PUBLICATIONS

U.S. Appl. No. 95/001,061, Reexamination of Stone et al.
U.S. Appl. No. 95/001,068, Reexamination of Stone et al.
U.S. Appl. No. 95/001,069, Reexamination of Stone et al.
U.S. Appl. No. 95/001,073, Reexamination of Stone et al.
Best practices for creating adaptive user interfaces with the mobile Internet toolkit:, Microsoft Corporation, Jan. 2002, pp. 1-2. Downloaded Dec. 21, 2006 from http://msdn.microsoft.com/library/default.asp?url=/library/en- us/dnmitta/html/bestpractaui.asp.
"eStara Push to Talk: The most popular click to call service in the world," downloaded from htto://www.estara.com on Jun. 29, 2004, 2 pgs.
"Ingenio: Click To Call Solutions," downloaded fromhtto://www.in2enio.com/documents/cominfo/clicktocall.aso?TF=I on Jun. 29, 2004, 3 pgs.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Broussard, Mitchel, "Chatbot-Like Siri Patent Includes Intelligent Image, Video, and Audio Recognition Within Messages", MacRumors, May 11, 2017, 11 pages.
Business Wire, "Global Network, Inc. Enters Into Agreement in Principle With Major Advertising Agency," Oct. 4, 1999.
Canadian Office Action on 2572468 dated Dec. 4, 2014.
Canadian Office Action on 2572468 dated Sep. 17, 2013.
Canadian Office Action on 2572471 dated Jan. 9, 2014.
Canadian Office Action on CA 2,572,471 dated Mar. 3, 2015.
Canadian Office Action to Canadian Patent Application No. 2,572,471 dated Mar. 16, 2009.

(56) References Cited

OTHER PUBLICATIONS

Chapter 12, Managing the Product, Class Notes, University of Delaware, http://www.udel.edu/alex/chapt12.html, accessed Mar. 13, 2015, 10 pgs.
Chen, Yilun Lulu, "Alibaba Challenges Google, Amazon With New Echo-Like Device", Bloomberg, Jul. 5, 2017, 3 pages.
Close, "Amazon Echo Will Give You These Deals If You Order Through Alexa This Weekend," Web Article, Nov. 18, 2016, Time. com (2 pages).
Decision of Rejection for Japanese Patent Application No. 2007-519374, dated Jun. 15, 2010 (3 pgs.) with translation (3 pgs.).
Decision of Rejection for Japanese Patent Application No. 2007-519407 dated Feb. 23, 2010.
Decision to Dismiss the Amendment for Korean Patent Application No. 10-2007-7002383 dated Jul. 9, 2010.
Dedrick, R., A Consumption Model for Targeted Electronic Advertising, Intel Architecture Labs, IEEE, 1995.
Dedrick, R., Interactive Electronic Advertising, IEEE, 1994.
Dickinger et al., "An Investigation and Conceptual Model of SMS Marketing," Proceedins of the 37th Hawaii International Conference on System Sciences, 2004, 10 pages.
European Office Action for EP Application No. 05763971.8, dated Mar. 29, 2011.
European Office Action on 05768157.9 dated Jan. 27, 2014.
European Office Action on EP 05 768 157.9 date Aug. 21, 2014.
European Office Action on EP 05 768 157.9 dated Jul. 23, 2015.
Examiner's First Report on Australian Patent Application No. 2005259861 dated Mar. 6, 2008 (2 pgs.).
Examiner's First Report to Australian Patent Application No. 2005260566 dated Mar. 4, 2008.
Examiner's Re-Examination Report for Australian Patent Application No. 2005259861, dated Dec. 1, 2011 (2 pgs.).
Examiner's Report for Canadian Patent Application No. 2,572,468, dated Dec. 29, 2011 (4 pgs.).
First Examination Report for Indian Patent Application No. 144/MUMNP/2007, dated Jun. 19, 2008 (2 pgs.).
First Office Action for Japanese Patent Application No. 2010-142707 dated Nov. 13, 2012.
First Office Action for Japanese Patent Application No. 2010-232591, dated Feb. 19, 2013 (3 pgs.) with translation (4 pgs.).
Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.
Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . .'" Cnet, May 18, 2017, 7 pages.
Google Developers Newsletter "Google Assistant SDK", developers. google.com, 2 pages.
Gurma, Mark and Webb, Alex, "Apple Is Manufacturing a Siri Speaker to Outdo Google and Amazon", Bloomberg, May 31, 2017, 3 pages.
Information Access Technologies, Inc., Aaddzz brochure, "The Best Way To Buy And Sell Web Advertising Space," © 1997.
Information Access Technologies, Inc., Aaddzz.com website archive from www.Archive.org, archived on Jan. 30, 1998.
International Search Report & Written Opinion on PCT/US2013/042376 dated Feb. 28, 2014.
Japanese Decision of Rejection on 2010-232591 dated Jan. 27, 2014.
Japanese Office Action issued in JP application 2010-142707 dated Jul. 23, 2013.
Japanese Office Action on JP 2014-010608 dated Nov. 18, 2014, 12 pages (English translation).
Japanese Office Action on JP2010-232591 dated Jun. 9, 2015.
Jones, Matt et al., "Improving Web Interaction in Small Displays", Computer Networks, vol. 31, pp. 1129-1137 (May 17, 1999).
Kato, Sako, "Keyword Advertisement", Internet Magazine, 2nd Stage, No. 2,pp. 112-123, Japan, Impress Holdings, Inc. (May 1, 2004).
Koetsier, John, "Ads On Amazon Echo: Wendy's, ESPN, And Progressive Among Brands Testing", Forbes, May 11, 2017, 3 pages.
Lee, Dave, "The five big announcements from Google I/O", BBC, May 18, 2017, 11 pages.
Microsoft Corporation, "Best Practices for Creating Adaptive User Interfaces with the Mobile Internet Toolkit", Jan. 2002, pp. 1-2, XP008144654.
Morton to Baluja email (1 pg).
Notice of Final Rejection for Korean Patent Application No. 10-2007-7002383 dated Apr. 22, 2010.
Notice of Final Rejection for Korean Patent Application No. 10-2007-7002385 dated Jul. 30, 2009 (5 pgs.) with translation (5 ps.).
Notice of Final Rejection for Korean Patent Application No. 10-2010-7013914 dated Sep. 14, 2011.
Notice of Preliminary Rejection for Korean Patent Application No. 10-2007-7002383 dated Jun. 10, 2008.
Notice of Preliminary Rejection for Korean Patent Application No. 10-2007-7002385, dated Jun. 10, 2008 (5 pgs.) with translation (6 pgs.).
Notice of Preliminary Rejection for Korean Patent Application No. 10-2010-7013914, dated Sep. 17, 2010.
Notice of Reasons for Rejection for Japanese Patent Application No. 2007-519374 dated Aug. 25, 2009 (3 pgs.) with translation (4 pgs.).
Notice of Reasons for Rejection for Japanese Patent Application No. 2007-519407 dated Jul. 7, 2009.
Notification of Preliminary Rejection for Korean Patent Application No. 10-2007-7002383 dated Jun. 10, 2009.
Notification of the First Office Action for Chinese Patent Application No. 200580025826.2 dated Dec. 18, 2009 (6 pgs.) with translation (7 pgs.).
Notification of the Second Office Action for Chinese Patent Application No. 200580025826.2, dated Jul. 22, 2011 (3 pgs.) with translation (4 pgs.).
Notification of the Second Office Action for Chinese Patent Application No. 200580025878.X, dated Oct. 26, 2011.
Notification of the Third Office Action for Chinese Patent Application No. 200580025826.2 dated Apr. 11, 2012 (5 pgs.) with translation (7 pgs.).
Notification of the Third Office Action for Chinese Patent Application No. 200580025878.X, dated Feb. 21, 2012.
Office Action for Canadian Patent Application No. 2,572,471, dated May 21, 2010.
Office Action for Chinese Patent Application No. 200580025878.X, dated May 7, 2010.
Office Action for European Patent Application No. 05 763 971.8-2221 dated Mar. 29, 2011 (4 pgs.).
Office Action for European Patent Application No. 05768157.9-1958, dated Feb. 15, 2013.
Office Action for Japanese Patent Application No. 2007-519374, dated May 29, 2012 (19 pgs.) with translation (28 pgs.).
Office Action on U.S. Appl. No. 14/230,508 dated Nov. 28, 2014.
Official Letter of Inquiry for Japanese Patent Application No. 2007-519374 dated Oct. 4, 2011 (3 pgs.).
Page to Karima email (1 page).
PCT International Search Report (PCT/ISA/210) For International Application No. PCT/US05/23023 (2 pgs.) (dated Oct. 23, 2006).
PCT Written Opinion Of The International Searching Authority (PCT/ISA/237) For International Application No. PCT/US05/23023 (3 pgs.).
PCT/ISA/210, International Search Report for PCT/US05/23162 dated Feb. 5, 2007.
PCT/ISA/237, Written Opinion of the International Searching Authority forPCT/US05/23162 dated Feb. 5, 2007.
Perez, Sarah, "The first ad network for Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.

(56) References Cited

OTHER PUBLICATIONS

Request for Reexamination of U.S. Pat. No. 6,446,045 B1, Control No. 95/001,061.
Request for Reexamination of U.S. Pat. No. 6,829,587 B2, Control No. 95/001,068.
Request for Reexamination of U.S. Pat. No. 7,240,025 B2, Control No. 95/001,073.
Request for Reexamination of U.S. Pat. No. 7,249,059 B2, Control No. 95/001,069.
Sablich, Justin, "Planning a Trip With the Help of Google Home", New York Times, dated May 31, 2017, 6 pages.
Shintaro Gotoh et al., "Citizens Lectures on GIS using MANDARA and EXCEL, Make a Map by PC," Kokin Shoin (1st ed., Apr. 5, 2004, ISBN 4-7722-4051-9, Kokon, Japan) p. 62.
Smith, Dave, "The Amazon Echo got 2 incredibly useful features thanks to a new update", Business Insider, Jun. 1, 2017, 2 pages.
Statement of Grounds and Particulars in Support of Opposition for Australian Patent Application No. 2005259861, dated Jan. 22, 2010 (13 pgs.).
Statement Regarding References in 1449 Form.
Supplementary European Search Report for European Patent Application No. 05768157.9 dated Oct. 31, 2012.
Tedeschi, Bob, "Transforming Clicks Into Rings," (Jun. 7, 2004) downloaded fromwww.nvtimes.com on Jun. 6, 2004, 3 pgs.
U.S. Final Office Action on U.S. Appl. No. 13/441,298 dated Dec. 30, 2013.
U.S. Office Action on U.S. Appl. No. 10/880,686 dated May 7, 2008.
U.S. Office Action on U.S. Appl. No. 10/880,868 dated Apr. 1, 2016.
U.S. Office Action on U.S. Appl. No. 10/880,868 dated Dec. 4, 2008.
U.S. Office Action on U.S. Appl. No. 10/880,868 dated Mar. 24, 2015.
U.S. Office Action on U.S. Appl. No. 10/880,868 dated Nov. 28, 2014.
U.S. Office Action on U.S. Appl. No. 11/026,507 dated Apr. 6, 2015.
U.S. Office Action on U.S. Appl. No. 11/026,507 dated Aug. 14, 2014.
U.S. Office Action on U.S. Appl. No. 11/026,507 dated Jan. 12, 2010.
U.S. Office Action on U.S. Appl. No. 11/026,507 dated Jul. 21, 2010.
U.S. Office Action on U.S. Appl. No. 11/026,507 dated Mar. 24, 2011.
U.S. Office Action on U.S. Appl. No. 11/026,507 dated Mar. 30, 2009.
U.S. Office Action on U.S. Appl. No. 11/026,507 dated Oct. 29, 2015.
U.S. Office Action on U.S. Appl. No. 13/441,298 dated Jul. 17, 2013.
U.S. Office Action on U.S. Appl. No. 13/441,298 dated Jul. 6, 2015.
U.S. Office Action on U.S. Appl. No. 13/441,298 dated Nov. 20, 2015.
U.S. Office Action on U.S. Appl. No. 13/441,298 dated Jan. 13, 2017.
U.S. Office Action on U.S. Appl. No. 13/478,998 dated Jul. 31, 2015.
U.S. Office Action on U.S. Appl. No. 13/478,998 dated Feb. 27, 2017.
U.S. Office Action on U.S. Appl. No. 13/478,998 dated Jan. 20, 2016.
U.S. Office Action on U.S. Appl. No. 13/478,998 dated Oct. 5, 2016.
U.S. Office Action on U.S. Appl. No. 14/155,323 dated May 7, 2015.
U.S. Office Action on U.S. Appl. No. 14/172,353 dated Jul. 6, 2015.
U.S. Office Action on U.S. Appl. No. 14/172,353 dated Feb. 9, 2017.
U.S. Office Action on U.S. Appl. No. 14/172,353 dated Jan. 21, 2016.
U.S. Office Action on U.S. Appl. No. 14/230,508 dated Feb. 1, 2016.
U.S. Office Action on U.S. Appl. No. 14/230,508 dated Jun. 3, 2015.
Willens, Max, "For publishers, Amazon Alexa holds promise but not much money (yet)", Digiday, Jul. 6, 2017, 5 pages.
Zeff, R. et al., Advertising on the Internet, 2nd Ed., John Wiley & Sons, 1999.
"Walmart and Google to offer voice-enabled shopping", BBC News, Aug. 23, 2017.
Crist, Ry, "Logitech Harmony's Alexa Skill just got a whole lot better", cnet, Jul. 13, 2017 (2 pages).
Gibbs, Samuel, "Your Facebook Messenger app is about to be filled with ads", The Guardian, Jul. 12, 2017 (3 pages).
Hardwick, Tim, "Facebook Smart Speaker Coming Next Year With 15-inch Touch Panel", MacRumors, Jul. 25, 2017 (5 pages).
International Search Report on International Application No. PCT/US2005/023023, dated Oct. 23, 2006, 2 pages.
Kelion, Leo, "Amazon's race to make Alexa smarter", BBC News, Jul. 28, 2017 (8 pages).
U.S. Office Action on U.S. Appl. No. 14/172,353 dated Aug. 10, 2017, 15 pages.
U.S. Notice of Allowance on U.S. Appl. No. 13/478,998 dated Sep. 12, 2017.
U.S. Office Action on U.S. Appl. No. 15/395,703 dated Oct. 19, 2017.
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Coberly, "Apple patent filing reveals potential whispering Siri functionality", Techspot, Dec. 14, 2017, 4 pages.
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Heater, "Amazon Alexa devices can finally tell voices apart", TechCrunch, Oct. 11, 2017, 6 pages.
International Search Report and Written Opinion on International Application No. PCT/US2017/049782, dated Oct. 25, 2017, 16 pages.
Johnston, "Amazon Whirlwind: New Echo, Plus, Spot, Connect, Fire TV Take The Stage", Twice, Sep. 27, 2017, 4 pages.
Kelion, "Amazon revamps Echo smart speaker family", BBC News, Sep. 27, 2017, 11 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Notice of Allowance for U.S. Appl. No. 13/441,298 dated Nov. 2, 2017, 11 pages.
Novet, et al., "Amazon is getting ready to bring Alexa to wore", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.

(56) References Cited

OTHER PUBLICATIONS

Pringle, "'I'm sorry to hear that': Why training Siri to be a therapist won't be easy", CBC News, Sep. 24, 2017, 3 pages.
Unknown Author, "'Dolphin' attacks fool Amazon, Google voice assistants", BBC News, Sep. 7, 2017, 8 pages.
U.S. Office Action for U.S. Appl. No. 13/840,380 dated Dec. 6, 2017, 13 pages.
"Amazon and Google Want to Turn Their Smart Home Speakers Into Telephone Replacements—Mac Rumors" MacRumors, 9 pages.
"Apple Patent Reveals a New Security Feature Coming to Siri" 6 pages.
"Introducing Echo Look Hands-Free Camera and Style Assistant" 1996-2017, Amazon.com, Inc. 5 pages.
"The Patent Behind Google Home's New Feature of Understanding Different Voices in the Home Surfaced Today", Apr. 20, 2017, 5 pages.
Collins, Terry "Can Twitter Save itself? The Social Network is Slowly gaining users, but still Lags Far Behind Rivals. Is a Turnaround Possible?" 3 pages.
Cook, "A Siri for advertising: These mobile ads talk back to you," Web Article, Apr. 1, 2013, Geekwire.com (7 pages).
Golgowski, Nina, "This Burger King Ad Is Trying to Control Your Google Home Device", Apr. 12, 2017, 7 pages.
Larson, Selena "Google Home Now Recognizes your Individual Voice" dated Apr. 20, 2017, 3 pages.
Nieva, Richard, "Google Home and eBay can tell you how much that's worth", 3 pages.
Purcher, Jack "Today Google Home's Virtual Assistant Can Learn its Owner's Voice for Security Reason's like Apple's Patent Pending Idea" Apr. 20, 2017, 4 pages.
Seifert, Dan "Samsung's New Virtual Assistant Will Make Using Your Phone Easier", Mar. 20, 2017, 7 pages.
Sherr, Ian "IBM Built a Voice Assistant For Cybersecurity" dated Feb. 13, 2017, 4 pages.
Siegal, Daniel, "IP Attys Load Up Apps' Legal Challenges At Silicon Beach" 6 pages.
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
The International Search Report and The Written Opinion of the International Searching Authority for Application No. PCT/US2013/077834 dated Apr. 24, 2014, 5 pages.
U.S. Office Action dated Oct. 22, 2015.
U.S. Office Action on U.S. Appl. No. 13/840,380 dated Aug. 12, 2016.
U.S. Office Action on U.S. Appl. No. 13/840,380 dated Feb. 27, 2017.
"An Investigation of Conceptual Model of SMS Marketing", Dickinger A. and Haghirian P., Proceedings of 37th Hawaii International Conference on System Sciences, Jan. 2004, p. 8 paragraph 6.3.2 (Year:2004).
"How to Deep Link to Alexa Skills" dtd Oct. 11, 2017.
Buckland et al., "Amazon's Alexa Takes Open-Source Route to Beat Google Into Cars", Bloomberg, Feb. 27, 2018, 6 pages.
Final Office Action on U.S. Appl. No. 13/840,380 dated Aug. 3, 2018.
Final Office Action on U.S. Appl. No. 14/172,353 dated Dec. 14, 2018.
Korean Office Action for application No. 10-2017-7031603 dated Jan. 22, 2019.
Non-Final Office Action on U.S. Appl. No. 15/084,223 dated Sep. 4, 2018.
Non-Final Office Action on U.S. Appl. No. 15/189,826 dated Nov. 9, 2018.
Non-Final Office Action on U.S. Appl. No. 15/584,970 dated Nov. 16, 2018.
Non-Final Office Action on U.S. Appl. No. 15/603,701 dated Nov. 2, 2018.
Non-Final Office Action on U.S. Appl. No. 15/674,838 dated Nov. 30, 2018.
Non-Final Office Action on U.S. Appl. No. 16/039,202 dated Aug. 14, 2018.
Non-Final Office Action on U.S. Appl. No. 16/039,204 dated Aug. 15, 2018.
Notice of Allowance on U.S. Appl. No. 13/478,998 dated Sep. 21, 2018.
Notice of Allowance on U.S. Appl. No. 16/039,202 dated Dec. 10, 2018.
Notice of Allowance on U.S. Appl. No. 16/039,204 dated Dec. 10, 2018.
Notice of Allowance on U.S. Appl. No. 16/039,204 dated Jan. 17, 2019.
Notice of Allowance on U.S. Appl. No. 16/093,204 dated Mar. 20, 2019.
Notice of Reasons for Rejection for application No. 2017-556912 dated Mar. 4, 2019.
U.S. Notice of Allowance for U.S. Appl. No. 13/478,998 dated Apr. 23, 2018, 8 pages.
U.S. Notice of Allowance for U.S. Appl. No. 13/478,998 dated Jan. 26, 2018, 8 pages.
U.S. Notice of Allowance for U.S. Appl. No. 15/395,703 dated Apr. 4, 2018, 2 pages.
U.S. Notice of Allowance for U.S. Appl. No. 15/395,703 dated Feb. 14, 2018, 9 pages.
U.S. Notice of Allowance on U.S. Appl. No. 15/395,703 dated May 17, 2018.
U.S. Office Action for U.S. Appl. No. 14/172,353 dated Apr. 4, 2018, 22 pages.
U.S. Office Action on U.S. Appl. No. 14/172,353 dated May 17, 2018.
U.S. Appl. No. 95/001,061 Reexamination—Miscellaneous Action dated Jul. 2, 2013 (4 pages).
U.S. Appl. No. 95/001,061 Reexamination—Reexamination Terminated dated Jul. 2, 2013 (4 pages).
U.S. Appl. No. 95/001,061 Reexamination—"Certificate of Service" dated Mar. 24, 2012 (1 page).
U.S. Appl. No. 95/001,068 Reexamination—"Inter Partes Reexamination Certificate" for 6829587-C1 dated Jan. 8, 2013 (2 pages).
U.S. Appl. No. 95/001,068 Reexamination—Appeal No. 2011-013241, "Decision on Appeal" dated Jan. 27, 2012 (34 pages).
U.S. Appl. No. 95/001,068 Reexamination—Appeal No. 2011-013241, "Notice of Appeal" dated Mar. 24, 2012 (3 pages).
U.S. Appl. No. 95/001,068 Reexamination—Case 12-1379, Document 20, "Order" by the US Court of Appeals for the Federal Circuit dated Sep. 6, 2012 (2 pages).
U.S. Appl. No. 95/001,069 Reexamination—"Certificate of Service" dated Mar. 24, 2012 (1 page).
U.S. Appl. No. 95/001,069 Reexamination—"Inter Partes Reexamination Certificate" for U.S. Pat. No. 7,249,059-C1 dated Jul. 23, 2013 (2 pages).
U.S. Appl. No. 95/001,069 Reexamination—Appeal No. 2011-010893, "Decision on Appeal" dated Jan. 27, 2012 (34 pages).
U.S. Appl. No. 95/001,069 Reexamination—Appeal No. 2011-010893, "Notice of Appeal" dated Mar. 24, 2012 (3 pages).
U.S. Appl. No. 95/001,069 Reexamination—Case 12-1380, Document 54-1, Decision by the US Court of Appeals for the Federal Circuit dated Mar. 7, 2013 (8 pages).
U.S. Appl. No. 95/001,069 Reexamination—Case 12-1380, Document 54-2, "Information Sheet" dated Mar. 7, 2013 (1 page).
U.S. Appl. No. 95/001,069 Reexamination—Case 12-1380, Document 54-3, "Questions and Answers: Petitions for Panel Rehearing (Fed. Cir. R. 40) and Petitions for Hearing or Rehearing En Banc (Fed. Cir. R. 35)" dated Mar. 7, 2013 (1 page).
U.S. Appl. No. 95/001,069 Reexamination—Case 12-1380, Document 54-4, "Notice of Entry of Judgment Accompanied by Opinion" dated Mar. 7, 2013 (2 pages).
U.S. Appl. No. 95/001,069 Reexamination—Case 12-1380, Document 55-3, "Mandate" dated Apr. 29, 2013 (2 pages).
U.S. Appl. No. 95/001,073 Reexamination—"Certificate of Service" dated Mar. 24, 2012 (1 page).

(56) References Cited

OTHER PUBLICATIONS

U.S. Appl. No. 95/001,073 Reexamination—"Inter Partes Reexamination Certificate" for U.S. Pat. No. 7,240,025-C1 dated Jul. 23, 2013 (2 pages).
U.S. Appl. No. 95/001,073 Reexamination—Appeal No. 2011-010719, "Decision on Appeal" dated Jan. 27, 2012 (27 pages).
U.S. Appl. No. 95/001,073 Reexamination—Appeal No. 2011-010719, "Notice of Appeal" dated Mar. 24, 2012 (3 pages).
U.S. Appl. No. 95/001,073 Reexamination—Case 12-1380, Document 54-1, Decision by the US Court of Appeals for the Federal Circuit dated Mar. 7, 2013 (8 pages).
U.S. Appl. No. 95/001,073 Reexamination—Case 12-1380, Document 55-3, "Mandate" by the US Court of Appeals for the Federal Circuit dated Apr. 29, 2013 (2 pages).
Examination Report for AU Appln. Ser. No. 2017384996 dated Nov. 25, 2019 (2 pages).
Non-Final Office Action for U.S. Appl. No. 10/880,868 dated Sep. 23, 2009 (7 pages).
Notice of Allowance for KR Appln. Ser. No. 10-2019-7018803 dated Oct. 11, 2019 (3 pages).
Notice of Allowance for U.S. Appl. No. 13/840,380 dated Dec. 11, 2019 (12 pages).
Notice of Allowance for U.S. Appl. No. 15/674,838 dated Dec. 3, 2019 (2 pages).
Notice of Allowance for U.S. Appl. No. 16/039,204 dated Oct. 30, 2019 (8 pages).
Office Action on KR 10-2019-7018803 dated Jul. 16, 2019.
U.S. Notice of Allowance for U.S. Appl. No. 13/840,380 dated May 14, 2019 (8 pages).
U.S. Notice of Allowance for U.S. Appl. No. 16/039,202 dated Apr. 4, 2019 (8 pages).
U.S. Notice of Allowance for U.S. Appl. No. 16/039,202 dated Jul. 17, 2019 (8 pages).
U.S. Notice of Allowance for U.S. Appl. No. 16/039,204 dated Jul. 15, 2019 (8 pages).
U.S. Office Action for U.S. Appl. No. 15/189,826 dated Jun. 3, 2019 (31 pages).
U.S. Office Action for U.S. Appl. No. 15/584,970 dated May 31, 2019 (23 pages).
U.S. Office Action for U.S. Appl. No. 15/603,701 dated Apr. 2, 2019 (14 pages).
U.S. Office Action for U.S. Appl. No. 15/674,838 dated Jun. 10, 2019 (6 pages).
JP Notice of Allowance for Appln. Ser. No. 2017-556912 dated Aug. 9, 2019 (6 pages).
Non-Final Office Action on U.S. Appl. No. 15/603,701 dated Sep. 12, 2019 (14 pages).
Non-Final Office Action on U.S. Appl. No. 15/638,291 dated Sep. 6, 2019 (22 pages).
Non-Final Office Action on U.S. Appl. No. 15/638,295 dated Sep. 6, 2019 (26 pages).
Final Office Action for U.S. Appl. No. 10/880,868 dated Apr. 13, 2010 (8 pages).
Final Office Action for U.S. Appl. No. 10/880,868 dated Jul. 17, 2009 (7 pages).
Fisher et al., "The Role of Text Analytics and Information Retrieval in the Accounting Domain," Journal of Emerging Technologies in Accounting, vol. 7, Dec. 2010 (25 pages).
International Preliminary Report on Patentability for PCT/US2013/042376 dated Dec. 4, 2014 (10 pages).
Non-Final Office Action for U.S. Appl. No. 13/840,380 dated Mar. 26, 2015 (26 pages).
Notice of Allowance for KR 10-2017-7031603 dated Mar. 28, 2019 (3 pages).
Notice of Allowance for U.S. Appl. No. 13/840,380 dated Sep. 20, 2019 (11 pages).
Notice of Allowance for U.S. Appl. No. 15/674,838 dated Sep. 20, 2019 (8 pages).
Notice of Allowance for U.S. Appl. No. 16/039,202 dated Oct. 9, 2019 (8 pages).
Xue et al., "Unstructured Queries Based On Mobile User Context," International Journal of Pervasive Computing and Communications, vol. 8, No. 4, dated Aug. 27, 2012 (28 pages).
"Wiley Encyclopedia of Computer Science and Engineering: Volume I", Wiley-Interscience, Nov. 2008 (2365 pages).
Feng et al., "Active Profiling of Physical Devices at Internet Scale", IEEE, 2016 (9 pages).
Final Office Action for U.S. Appl. No. 15/638,291 dated Jan. 30, 2020 (24 pages).
Final Office Action for U.S. Appl. No. 15/638,295 dated Jan. 30, 2020 (25 pages).
Non-Final Office Action for U.S. Appl. No. 15/587,132 dated Mar. 5, 2020 (24 pages).
Non-Final Office Action for U.S. Appl. No. 16/666,780 dated Jan. 27, 2020 (10 pages).
Notice of Allowance for U.S. Appl. No. 15/603,701 dated Jan. 10, 2020 (8 pages).
Notice of Allowance tor U.S. Appl. No. 15/638,298 dated Feb. 21, 2020 (15 pages).
Notice of Allowance for U.S. Appl. No. 15/674,838 dated Mar. 11, 2020 (8 pages).
Notice of Allowance for U.S. Appl. No. 15/603,701 dated Apr. 22, 2020 (8 pages).
Notice of Allowance for U.S. Appl. No. 16/666,780 dated Apr. 14, 2020 (6 pages).
Notice of Allowance for U.S. Appl. No. 15/638,298 dated May 12, 2020 (13 pages).

\* cited by examiner

CANONICALIZED ONLINE DOCUMENT SITELINK GENERATION

CROSS-REFERENCE TO RELATED APPLICATION

This application claims the benefit of priority under 35 U.S.C. § 120 as a continuation of U.S. patent application Ser. No. 13/840,380, filed Mar. 15, 2013, and titled "ENHANCING SITELINKS WITH CREATIVE CONTENT", which claims the benefit of priority under 35 U.S.C. § 119 to U.S. Provisional Patent Application No. 61/758,979, filed Jan. 31, 2013, and titled "ENHANCING SITELINKS WITH CREATIVE CONTENT," each of which are hereby incorporated by reference herein in their entirety.

BACKGROUND

An online search provider can provide primary search results to the online user. In addition to the primary search results, the online search provider may also provide additional content to the online user. This additional content may be provided by the online content providers associated with the websites included within the search results. For example, a first search result may include a first or primary website associated with a first online content provider. The first online content provider may have a plurality of potential items of additional or secondary content, incorporating different landing pages that are related or otherwise relevant to the search specified by the online user. It may be challenging for processors to efficiently provide secondary content due to the plurality of potential items.

BRIEF DESCRIPTION OF THE DISCLOSURE

This description relates to online content, and, more particularly, to a method and system for enhancing sitelinks provided by an online content provider and displayed by an online search provider, wherein the enhancement includes adding relevant creative text to the sitelinks.

When an online user performs an online search, an online search provider will provide primary search results to the online user. In addition to the primary search results, the online search provider may also provide additional content to the online user. This additional content may be provided by the online content providers associated with the websites included within the search results. For example, a first search result may include a first or primary website associated with a first online content provider. The first online content provider may have a plurality of potential items of additional or secondary content, incorporating different landing pages that are related or otherwise relevant to the search specified by the online user.

To make the additional or secondary content available to the online user, the online content provider may choose to provide additional links to the items of additional or secondary content in the form of sitelinks, which can be presented to the online user in addition to the first or primary result(s) of the search. By providing such sitelinks, the online user, who may be more interested in one of the items of additional or secondary content, can directly view the item of additional or secondary content with a single click. Sitelinks have proven to be very successful in providing such additional or secondary content to online users. However, for some kinds of online searches, in which the search terms are very broad, the sitelinks, by themselves, may not provide enough information, or the most relevant information, to the online user, so as to prompt the online user to click on the sitelink. As a result, opportunities for presenting additional or secondary content to online users may be missed. Specifically, the online user may not click on any of the sitelinks provided, or may not reach the sitelink most relevant to the search specified by the user with a single click. As click counts are important to online content providers, the loss of clicks is an undesirable outcome. In addition, failure to provide the online user with the most relevant search result is also an undesirable outcome.

Accordingly, it would be desirable to provide a method for matching creative texts to sitelinks to additional or secondary content for presentation to an online user in such a way that the resulting combinations of sitelinks and creative texts are more relevant to the search specified by the online user.

In an aspect, a computer-implemented method for automatically matching a sitelink with a creative is provided. The method is implemented using a computing device coupled to a memory device. The method includes storing within the memory device a plurality of creatives, each creative being associated with a uniform resource locator (URL). The method further includes canonicalizing each URL associated with each of the plurality of creatives. The method further includes clustering the plurality of canonicalized URLs into creative clusters, wherein each creative cluster includes a plurality of clustered creatives each having a substantially similar canonicalized URL associated therewith. The method further includes receiving, at the computing device, a sitelink having a sitelink URL associated therewith. The method further includes canonicalizing the received sitelink URL. The method further includes matching the canonicalized sitelink URL with one of the creative clusters to generate a candidate set of creatives for the received sitelink. The method further includes associating a selected creative from the candidate set of creatives with the received sitelink based on at least one of filter rules and a scoring methodology.

In another aspect, a computer system is provided. The computer system includes a processor and a computer-readable storage device having encoded thereon computer readable instructions that are executable by the processor. The computer-executable instructions cause the processor to store within the memory device a plurality of creatives, each creative being associated with a uniform resource locator (URL). The computer-executable instructions further cause the processor to canonicalize each URL associated with each of the plurality of creatives. The computer-executable instructions further cause the processor to cluster the plurality of canonicalized URLs into creative clusters, wherein each creative cluster includes a plurality of clustered creatives each having a substantially similar canonicalized URL associated therewith. The computer-executable instructions further cause the processor to receive, at the computing device, a sitelink having a sitelink URL associated therewith. The computer-executable instructions further cause the processor to canonicalize the received sitelink URL. The computer-executable instructions further cause the processor to match the canonicalized sitelink URL with one of the creative clusters to generate a candidate set of creatives for the received sitelink. The computer-executable instructions further cause the processor to associate a selected creative from the candidate set of creatives with the received sitelink based on at least one of filter rules and a scoring methodology.

In another aspect, computer-readable storage media having computer-executable instructions embodied thereon are provided. When executed by at least one processor associated with a first computing device and a memory device, the computer-executable instructions cause the processor to store within the memory device a plurality of creatives, each creative being associated with a uniform resource locator (URL). The computer-executable instructions further cause the processor to canonicalize each URL associated with each of the plurality of creatives. The computer-executable instructions further cause the processor to cluster the plurality of canonicalized URLs into creative clusters, wherein each creative cluster includes a plurality of clustered creatives each having a substantially similar canonicalized URL associated therewith. The computer-executable instructions further cause the processor to receive, at the computing device, a sitelink having a sitelink URL associated therewith. The computer-executable instructions further cause the processor to canonicalize the received sitelink URL. The computer-executable instructions further cause the processor to match the canonicalized sitelink URL with one of the creative clusters to generate a candidate set of creatives for the received sitelink. The computer-executable instructions further cause the processor to associate a selected creative from the candidate set of creatives with the received sitelink based on at least one of filter rules and a scoring methodology.

In another aspect, a system for automatically matching a sitelink with a creative is provided. The system includes means for storing within a memory device a plurality of creatives, each creative being associated with a uniform resource locator (URL). The system also includes means for canonicalizing each URL associated with each of the plurality of creatives. The system further includes means for clustering the plurality of canonicalized URLs into creative clusters, wherein each creative cluster includes a plurality of clustered creatives each having a substantially similar canonicalized URL associated therewith. The system additionally includes means for receiving a sitelink having a sitelink URL associated therewith, means for canonicalizing the received sitelink URL, and means for matching the canonicalized sitelink URL with one of the creative clusters to generate a candidate set of creatives for the received sitelink. The system additionally includes means for associating a selected creative from the candidate set of creatives with the received sitelink based on at least one of filter rules and a scoring methodology.

In another aspect, the system described above is provided, wherein the system further includes means for pruning the candidate set of creatives by removing at least one of duplicate creatives and redundant creatives.

In another aspect, the system described above is provided, wherein the means for associating a selected creative from the candidate set of creatives with the received sitelink based on at least one of filter rules further includes means for the filter rules including at least one of demographic rules, language rules, geographic rules, user device rules, platform rules, and advertiser campaign rules.

In another aspect, the system described above is provided, wherein the means for canonicalizing the received sitelink URL further includes means for crawling the sitelink URL with and without a URL parameter associated with the sitelink URL, comparing the landing pages, and removing the parameter from the sitelink URL when the landing pages match.

In another aspect, the system described above is provided, wherein the means for receiving a sitelink having a sitelink URL associated therewith further includes means for receiving a plurality of sitelinks each having at least one URL associated therewith.

In another aspect, the system described above is provided, wherein the means for canonicalizing the received sitelink URL further includes means for processing webmaster supplied rules indicating the relevance of URL parameters.

In another aspect, the system described above is provided, wherein the means for canonicalizing each URL associated with each of the plurality of creatives further includes means for comparing contents of landing pages associated with the creative-associated URLs to identify similarities amongst the respective landing pages.

In another aspect, the system described above is provided, wherein the means for canonicalizing each URL associated with each of the plurality of creatives further includes means for processing webmaster supplied rules indicating the relevance of URL parameters.

In another aspect, the system described above is provided, wherein the means for associating a selected creative from the candidate set of creatives with the received sitelink further includes means for associating the selected creative based on an algorithm in which the received sitelink is matched with an as-yet unmatched creative having a highest matching score from amongst unmatched creatives.

In another aspect, the system described above is provided, wherein the means for associating a selected creative from the candidate set of creatives with the received sitelink further includes means for associating the selected creative based on an optimal algorithm configured to maximize total matching scores amongst a plurality of received sitelinks and as-yet unmatched creatives.

In another aspect, the system described above is provided, wherein the means for associating a selected creative from the candidate set of creatives with the received sitelink based on a scoring methodology further includes means for associating the selected creative based on a scoring methodology including determining an impression score which indicates a number of impressions associated with the selected creative.

In another aspect, the system described above is provided, wherein the means for associating a selected creative from the candidate set of creatives with the received sitelink based on a scoring methodology further includes means for determining an inverse-document-frequency (IDF) score indicating similarity of terms between a sitelink text and a creative text.

The features, functions, and advantages described herein may be achieved independently in various embodiments of the present disclosure or may be combined in yet other embodiments, further details of which may be seen with reference to the following description and drawings.

Figure 1:
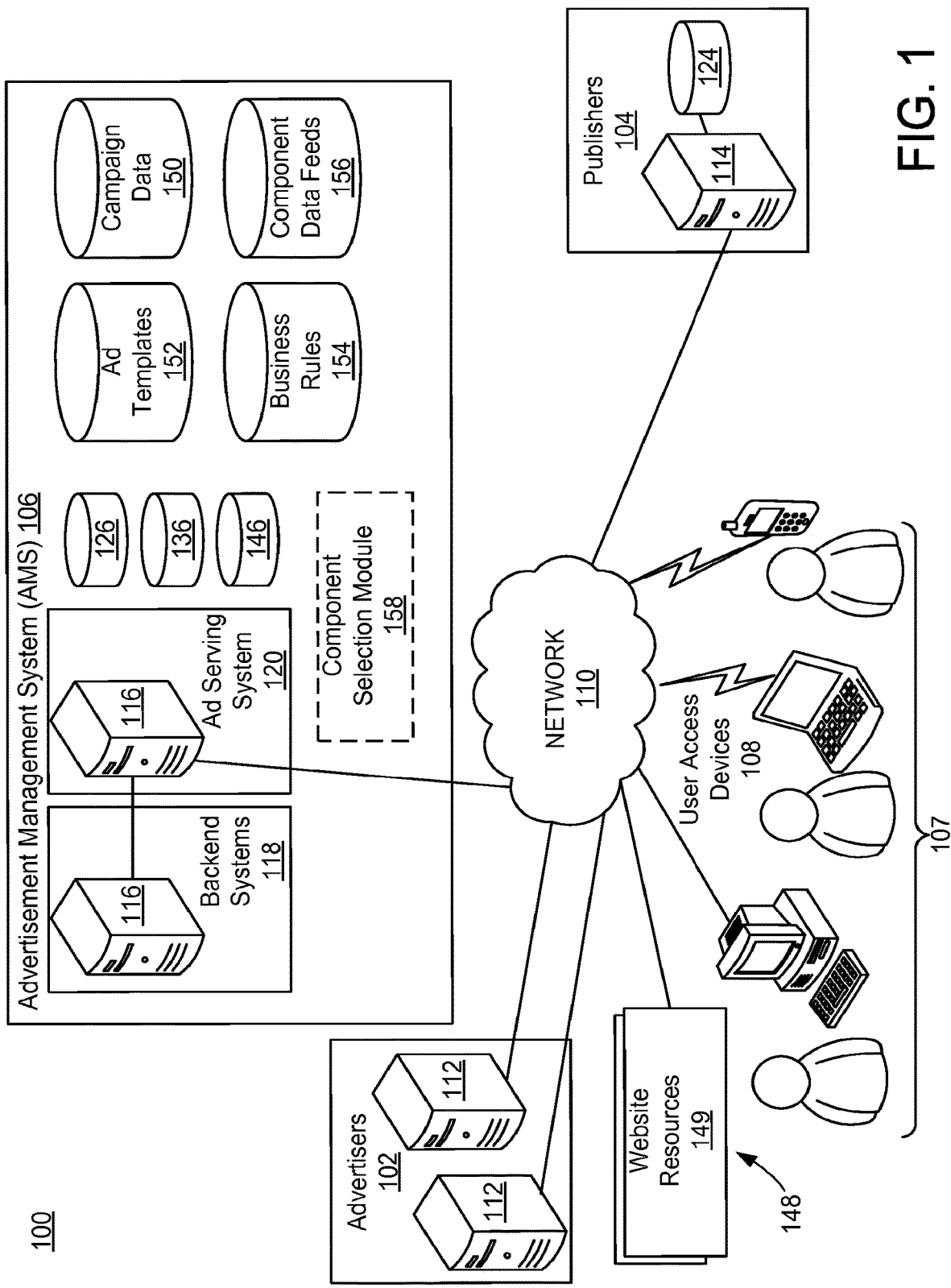
FIG. 1 is a block diagram depicting an example advertising environment.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description of implementations consistent with the principles of the disclosure refers to the accompanying drawings. The same reference numbers in different drawings may identify the same or similar elements. Also, the following detailed description does not limit the disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The subject matter described herein relates generally to online content and/or online advertising. Specifically, the methods and systems herein enable relevant items of creative text ("creatives") stored in a content provider database to be matched with specific sitelinks. The resulting presentation to an online user, referred to as an "enhanced sitelink," provides additional relevant information regarding the sitelink. A typical content provider/advertiser may have provided a content providing network or system with hundreds or thousands of creatives, each of which may be associated with one or more keywords, geographies or languages. Some of these creatives may be relevant to a set of sitelinks that the content provider may choose to add subsequently to a campaign. The sitelinks do not need to originate from or belong to the same ad campaign, ad group or other entity, as the creatives with which the sitelinks are ultimately matched, as long as the sitelinks and creatives are associated with the same content provider. From a content provider standpoint, having to manually manage and possibly duplicate the creatives for sitelinks purposes can be burdensome. Manual management of creative and sitelink matching may also create consistency issues that may arise when one of the creatives or campaigns needs to be paused or changed.

The methods and systems described herein may be implemented using computer programming or engineering techniques including computer software, firmware, hardware or any combination or subset thereof, wherein the technical effect may be achieved by performing at least one of the following steps: a) storing within a memory device a plurality of creatives, each creative being associated with a uniform resource locator (URL); b) canonicalizing each URL associated with each of the plurality of creatives; c) clustering the plurality of canonicalized URLs into creative clusters, wherein each creative cluster includes a plurality of clustered creatives each having a substantially similar canonicalized URL associated therewith; d) receiving, at the computing device, a sitelink having a sitelink URL associated therewith; e) canonicalizing the received sitelink URL; f) matching the canonicalized sitelink URL with one of the creative clusters to generate a candidate set of creatives for the received sitelink; g) associating a selected creative from the candidate set of creatives with the received sitelink based on at least one of filter rules and a scoring methodology; h) pruning the candidate set of creatives by removing at least one of duplicate creatives and redundant creatives; i) crawling the sitelink URL with and without a URL parameter associated with the sitelink URL, comparing the landing pages, and removing the parameter from the sitelink URL when the landing pages match; j) receiving a plurality of sitelinks each having at least one URL associated therewith; k) processing webmaster supplied rules indicating the relevance of URL parameters; l) comparing contents of landing pages associated with the creative-associated URLs to identify similarities amongst the respective landing pages; m) determining an impression score which indicates a number of impressions associated with the selected creative; and n) determining an inverse-document-frequency (IDF) score indicating similarity of terms between a sitelink text and a creative text.

The following description refers to the accompanying drawings, in which, in the absence of a contrary representation, the same numbers in different drawings represent similar elements.

With reference to FIG. 1, an example content providing 100 may include one or more content providers/advertisers 102, one or more publishers 104, a content provider management system or advertisement management system (AMS) 106, and one or more user access devices 108, used by one or more users 107. User access devices 108 may be coupled to a network 110. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as a content providing distribution network. While reference is made to distributing advertisements, the environment 100 can be suitable for distributing other forms of content including other forms of sponsored content.

The content providers 102 may include any entities that are associated with online content such as advertisements ("ads"). An advertisement or an "ad" refers to any form of communication in which one or more products, services, ideas, messages, people, organizations or other items are identified and promoted (or otherwise communicated). Ads are not limited to commercial promotions or other communications. An ad may be a public service announcement or any other type of notice, such as a public notice published in printed or electronic press or a broadcast. An ad may be referred to or include sponsored content.

Ads may be communicated via various mediums and in various forms. In some examples, ads may be communicated through an interactive medium, such as the Internet, and may include graphical ads (e.g., banner ads), textual ads, image ads, audio ads, video ads, ads combining one of more of any of such components, or any form of electronically delivered advertisement. Ads may include embedded information, such as embedded media, links, meta-information, and/or machine executable instructions. Ads could also be communicated through RSS (Really Simple Syndication) feeds, radio channels, television channels, print media, and other media.

The term "ad" can refer to both a single "creative" and an "ad group." A creative refers to any entity that represents one ad impression. An ad impression refers to any form of presentation of an ad such that it is viewable/receivable by a user. In some examples, an ad impression may occur when an ad is displayed on a display device of a user access device. An ad group refers, for example, to an entity that represents a group of creatives that share a common characteristic, such as having the same ad selection and recommendation criteria. Ad groups can be used to create an ad campaign.

The content providers 102 may provide (or be otherwise associated with) products and/or services related to online content. The content providers 102 may include or be associated with, for example, retailers, wholesalers, warehouses, manufacturers, distributors, health care providers, educational establishments, financial establishments, technology providers, energy providers, utility providers, or any other product or service providers or distributors.

The content providers 102 may directly or indirectly generate maintain, review and/or analyze online content, which may be related to products or services offered by or otherwise associated with the content providers 102. The content providers 102 may include or maintain one or more data processing systems 112, such as servers or embedded systems, coupled to the network 110. The content providers 102 may include or maintain one or more processes that run on one or more data processing systems.

The publishers 104 may include any entities that generate, maintain, provide, present and/or otherwise process publications in the environment 100. "Publishers," in particular, includes authors of online publications, wherein authors may be individual persons, or, in the case of works made for hire, the proprietor(s) who hired the individual(s) responsible for creating the online publications. The term "publications" refers to various types of web-based and/or otherwise presented information, such as articles, discussion threads, reports, analyses, financial statements, music, video, graphics, search results, web page listings, information feeds (e.g., RSS feeds), television broadcasts, radio broadcasts, printed publications, etc.

In some implementations, the publishers 104 may have an Internet presence, such as online publication and news providers (e.g., online newspapers, online magazines, television websites, etc.), online service providers (e.g., financial service providers, health service providers, etc.), and the like. The publishers 104 can include television broadcasters, radio broadcasters, satellite broadcasters, and other publication providers. One or more of the publishers 104 may represent a publication network that is associated with the AMS 106.

The publishers 104 may receive requests from the user access devices 108 (or other elements in the environment 100) and provide or present publications to the requesting devices. The publishers may provide or present publications via various mediums and in various forms, including web based and non-web based mediums and forms. The publishers 104 may generate and/or maintain such publications and/or retrieve the publications from other network resources.

In addition to publications, the publishers 104 may be configured to integrate or combine retrieved publications with online content such as ads that are related or relevant to the retrieved content for display to users. As discussed further below, this relevant online content, such as ads, may be provided from the AMS 106 and be combined with publications for display to users. In some examples, the publishers 104 may retrieve publications for display on a particular user access device 108 and then forward the publications to the user access device 108 along with code that causes one or more ads from the AMS 106 to be displayed to the user. In other examples, the publishers 104 may retrieve publications, retrieve one or more relevant ads (e.g., from the AMS 106 or the content providers 102), and then integrate the ads and the article to form a content page for display to the user.

As noted above, one or more of the publishers 104 may represent a publications network. In such an implementation, the content providers 102 may be able to present ads to users through this publications network.

The publishers 104 may include or maintain one or more data processing systems 114, such as servers or embedded systems, coupled to the network 110. They may include or maintain one or more processes that run on data processing systems. In some examples, the publishers 104 may include one or more content repositories 124 for storing publications and other information.

The AMS 106 manages online content including ads and provides various services to the content providers 102, the publishers 104, and the user access devices 108. The AMS 106 may store online content, such as ads, in an ad repository 136 and facilitate the distribution or selective provision and recommendation of ads through the environment 100 to the user access devices 108. In some configurations, the AMS 106 may include or access functionality associated with other content provider systems.

The AMS 106 may include one or more data processing systems 116, such as servers or embedded systems, coupled to the network 110. It can also include one or more processes, such as server processes. In some examples, the AMS 106 may include an ad serving system 120 and one or more backend processing systems 118. The ad serving system 120 may include one or more data processing systems 116 and may perform functionality associated with delivering ads to publishers or user access devices. The backend processing systems 118 may include one or more data processing systems 116 may perform functionality associated with identifying relevant ads to deliver, processing various rules, performing filtering processes, generating reports, maintaining accounts and usage information, and other backend system processing. The AMS 106 can use the backend processing systems 118 and the ad serving system 120 to selectively recommend and provide relevant ads from the content providers 102 through the publishers 104 to the user access devices 108.

The AMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publisher content, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query.

The AMS 106 may include one or more interface or frontend modules for providing the various features to advertisers, publishers, and user access devices. For example, the AMS 106 may provide one or more publisher front-end interfaces (PFEs) for allowing publishers to interact with the AMS 106. The AMS 106 may also provide one or more advertiser front-end interfaces (AFEs) for allowing advertisers to interact with the AMS 106. In some examples, the front-end interfaces may be configured as web applications that provide users with network access to features available in the AMS 106.

The AMS 106 provides various online content management features to the content providers 102. The AMS 106 online content management features may allow users to set up user accounts, set account preferences, create ads, select keywords for ads, create campaigns or initiatives for multiple products or businesses, view reports associated with accounts, analyze costs and return on investment, selectively identify customers in different regions, selectively recommend and provide ads to particular publishers, analyze financial information, analyze ad performance, estimate ad traffic, access keyword tools, add graphics and animations to ads, etc.

The AMS 106 may allow the content providers 102 to create ads and input keywords for which those ads will appear. In some examples, the AMS 106 may provide content to user access devices or publishers when keywords associated with that content are included in a user request or requested content. The AMS 106 may also allow the content providers 102 to set bids for ads. A bid may represent the maximum amount an advertiser is willing to pay for each ad impression, user click-through of an ad or other interaction with an ad. A click-through can include any action a user takes to select an ad. The content providers 102 may also choose a currency and monthly budget.

The AMS 106 may also allow the content providers 102 to view information about ad impressions, which may be maintained by the AMS 106. The AMS 106 may be configured to determine and maintain the number of ad impressions relative to a particular website or keyword. The AMS 106 may also determine and maintain the number of click-throughs for an ad as well as the ratio of click-throughs to impressions.

The AMS 106 may also allow the content providers 102 to select and/or create conversion types for ads. A "conversion" may occur when a user consummates a transaction related to a given ad. A conversion could be defined to occur when a user clicks on an ad, is referred to the advertiser's web page, and consummates a purchase there before leaving that web page. In another example, a conversion could be defined as the display of an ad to a user and a corresponding purchase on the advertiser's web page within a predetermined time (e.g., seven days). The AMS 106 may store conversion data and other information in a conversion data repository 146.

The AMS 106 may allow the content providers 102 to input description information associated with online content, such as ads. This information could be used to assist the publishers 104 in determining ads to publish. The content providers 102 may additionally input a cost/value associated with selected conversion types, such as a five dollar credit to the publishers 104 for each product or service purchased.

The AMS 106 may provide various features to the publishers 104. The AMS 106 may deliver ads (associated with the content providers 102) to the user access devices 108 when users access content from the publishers 104. The AMS 106 can be configured to deliver ads that are relevant to publisher sites, site content and publisher audiences.

In some examples, the AMS 106 may crawl publications provided by the publishers 104 and deliver ads that are relevant to publisher sites, site publications and publisher audiences based on the crawled publications. The AMS 106 may also selectively recommend and/or provide ads based on user information and behavior, such as particular search queries performed on a search engine website, etc. The AMS 106 may store user-related information in a general database (not shown). In some examples, the AMS 106 can add search services (e.g., a search box) to a publisher site and deliver ads configured to provide appropriate and relevant content relative to search results generated by requests from visitors of the publisher site. A combination of these and other approaches can be used to deliver relevant ads.

The AMS 106 may allow the publishers 104 to search and select specific products and services as well as associated ads to be displayed with publications provided by the publishers 104. For example, the publishers 104 may search through ads in the ad repository 136 and select certain ads for display with their publications.

The AMS 106 may be configured to selectively recommend and provide ads created by the content providers 102 to the user access devices 108 directly or through the publishers 104. The AMS 106 may selectively recommend and provide online content, such as ads, to a particular publisher 104 (as described in further detail herein) or a requesting user access device 108 when a user requests search results or loads a publication from the publisher 104.

In some implementations, the AMS 106 may manage and process financial transactions among and between elements in the environment 100. For example, the AMS 106 may credit accounts associated with the publishers 104 and debit accounts of the content providers 102. These and other transactions may be based on conversion data, impressions information and/or click-through rates received and maintained by the AMS 106.

The user access devices 108 may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

Environment 100 further includes a website 148 including one or more resources 149 (e.g., text, images, multimedia content, and programming elements, such as scripts) associated with a domain name and hosted by one or more servers. Resources 149 can be relatively static (e.g., as in a publisher's webpage) or dynamically generated in response to user query (e.g., as in a search engine's result page).

User devices 108 can request resources 149 from a website 148. In turn, build data representing the resource 149 can be provided to the user access device 108 for presentation by the user access device 108. The build data representing the resource 149 can also include data specifying an ad slot in which advertisements can be presented.

When a resource 149 is requested by a user access device 108, the AMS 106 receives a request for advertisements to be provided with the resource 149. The request for advertisements can include characteristics of the advertisement slots (e.g., size, web address of the resource, media type of the requested advertisement, etc.) that are defined for the requested resource or search results page, and can be provided to the AMS 106.

Based on data included in the request for advertisements, the AMS 106 can identify advertisements that are eligible to be provided in response to the request. For example, eligible advertisements can have characteristics matching the characteristics of available advertisement slots and have ad serving keywords that match the specified resource keywords or search queries.

Each content provider 102 can create one or more advertising campaigns using various campaign parameters that are used to control distribution of the advertiser's advertisements. Each advertising campaign can include one or more ad groups that have modified campaign parameters that are specific to the ad group. Examples of campaign parameters can include ad serving keywords and corresponding bids, geographic or other factors used to facilitate ad serving, delivery period, publication network, keyword match type, as well as other parameters corresponding to one or more advertisements. The campaign data can be stored in the campaign data store 150. The AMS 106 can retrieve the information in the campaign data store 150 when preparing a response to an ad request.

Dynamic ads are advertisements that are dynamically generated according to an ad template using one or more components. For example, an ad template can be a creative that specifies one or more component slots each requiring a component of a desired component type, such as a background image, a headline, a promotional slogan, a product image, a price quote, a landing page URL, a call-to-action (e.g., a message promoting a viewer action such as "Register Now!"), and so on. A component can be associated with a single component type based on the component's structural or format characteristics or the component's function in the ad template. In some implementations, a component may also be associated with various attribute values (e.g., color, font, model number, customer rating, etc.). As used in this specification, a component is a data item that has structural and format qualities meeting the specifications of a component type. Components of the same component type are interchangeable in a corresponding component slot of a content item template when constructing a content item. Content items generated using different components for the same component slots are identical except for the portions of each content item that are affected by the content and/or attributes of the different components.

Parameters related to an advertisement can include, for example, creative identifier, creative name, creative type, size, first line, web address of the landing page, display URL, media type, and so on. One of the creative types that an advertiser can specify for an ad is the dynamic ad type. The advertiser can provide an ad template as the creative, and the ad template can be selected (e.g., in the same manner as other types of creatives) to fulfill a received ad request for an available advertisement slot. When an ad template (or in other words, a dynamic ad creative) is selected to fulfill an ad request, a dynamic ad can be generated on-the-fly based on the ad template to fulfill the ad request.

The AMS 106 can have access to a large number of available components of various types, for example, through a component data feed store 156. The components can have varying content. The component data feed store 156 can be provided and updated by the advertiser from time to time. In some implementations, the component data feed store 156 can be linked to the advertiser's product catalogs or other business data stores, such that real-time data can be made available to the AMS 106 without active intervention by the advertiser.

The AMS 106 can select components from among the large number of components available in the component data feed store 156. The AMS 106 can also apply the selected components to the component slots in a dynamic ad according to the specifications in an ad template selected from the ad template data store 152. Once the dynamic ad is constructed using the selected components, the dynamic ad can be provided by an AMS to fulfill the received ad request. In some implementations, a component selection module 158 can be implemented to carry out actions related to component selection. The component selection module 158 can be part of the AMS 106 or a standalone module in communication with the AMS 106.

When the AMS 106 selects components for the selected ad template in response to a received ad request, the AMS 106 observes the business rules including the co-occurrence constraints specified for the selected ad template. The business rules can be specified by the advertiser through an interface provided by the AMS 106. The business rules can be stored in the campaign data store along with other campaign data. Alternatively, the business rules can be stored in a business rule data store 154 apart from other types of campaign data. The business rules can be campaign specific, ad group specific, or ad template specific, for example.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed content providers 102, publishers 104 and/or user access devices 108, which may be discrete, integrated modules or distributed systems. Similarly, the environment 100 is not limited to a single AMS 106 and may include any number of integrated or distributed AMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes run on separate machines or a single process running on a single machine.

An advertiser can specify parameters of advertising campaigns and advertisements through a content provider management system or advertisement management system. The content provider management system or advertisement management system can receive ad requests from user devices and select ads according to information in the ad requests and the parameters of the advertising campaigns. The ads that are delivered can include dynamically generated ads as described above.

Figure 2:
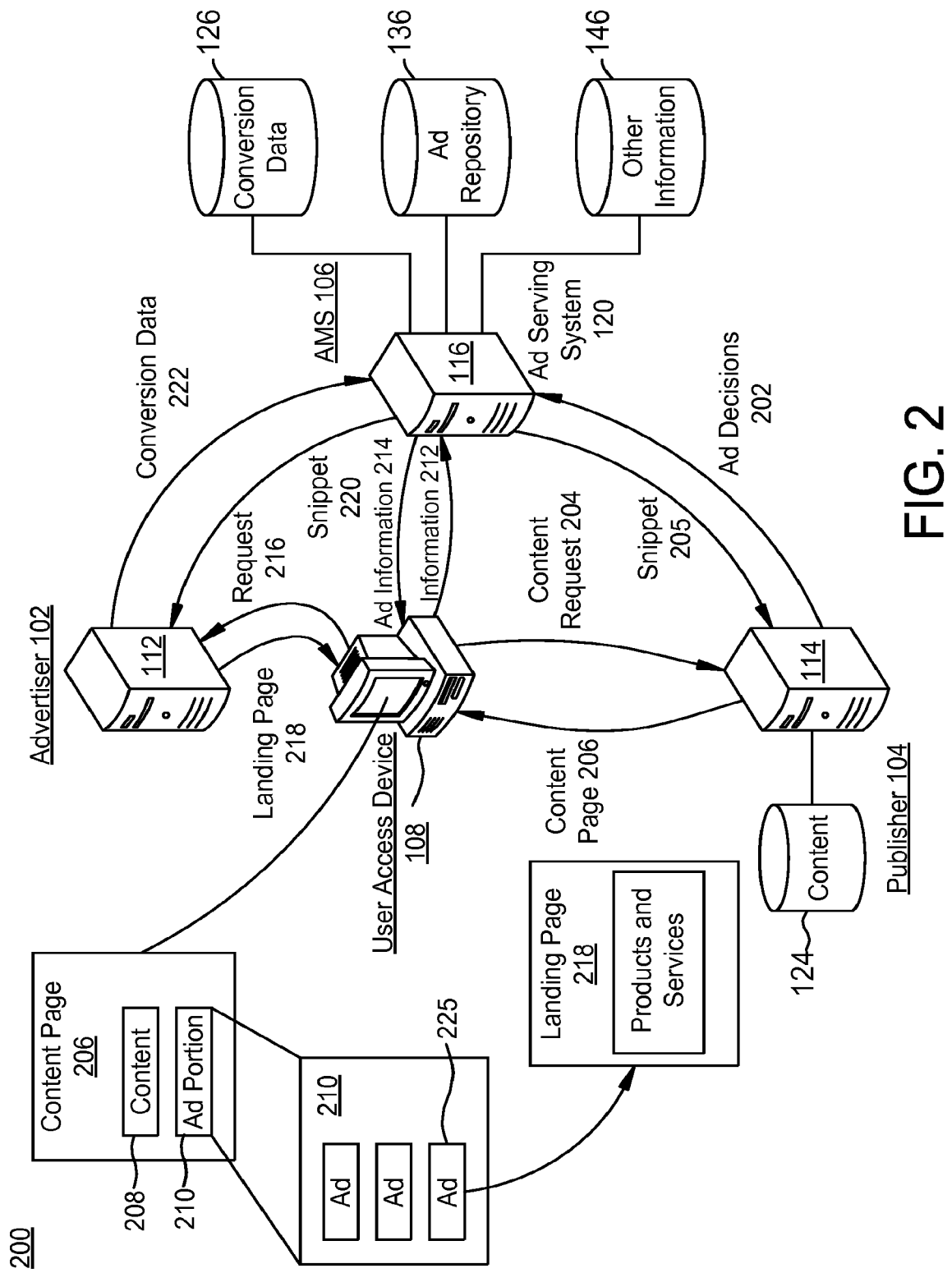
FIG. 2 is a diagram of an example advertising serving system shown in FIG. 1, in which an aspect of the methods and systems described herein may be employed in accordance with one embodiment of the present disclosure.

FIG. 2 illustrates an example data flow 200 within the environment 100. The data flow 200 is an example only and not intended to be restrictive. Other data flows may therefore occur in the environment 100 and, even with the data flow 200, the illustrated events and their particular order in time may vary.

In the data flow 200, the AMS 106 stores ads from the content providers 102 and receives ad decisions 202 from a particular publisher 104. The ad decisions 202 can include decisions to approve and/or disapprove certain ads and/or advertisers. These ad decisions can be based on aggregated ratings or scores, associated with ads/advertisers that are provided to the publisher 104 by the AMS 106. Such aggregated scores can represent ratings of ads/advertisers received from multiple publishers 104.

During the data flow 200, the publisher 104 may receive a content or publication request 204 from a particular user access device 108. The content request 204 may, for example, include a request for a web document on a given topic (e.g., automobiles). In response to the content request 204, the publisher 104 may retrieve relevant publications (e.g., an automobile article) from the content repository 124 or some other source.

The publisher 104 may respond to the content request 204 by sending a content page 206 or other presentation to the requesting user access device 108. The content page 206 may include the requested content 208 (e.g., the automobile article) as well as a code "snippet" 205 associated with an ad. A code "snippet" refers, for example, to a method used by one device (e.g., a server) to ask another device (e.g., a browser running on a client device) to perform actions after or while downloading information. In some examples, a code "snippet" may be implemented in JAVASCRIPT® code or may be part of HTML (Hypertext Markup Language) or other web page markup language or content.

The AMS 106 may provide the code snippet 205 to the publisher 104 and/or the user access device 108. The code snippet can originate and/or be provided from other sources. As the requesting user access device 108 loads the content page 206, the code snippet 205 causes the user access device 108 to contact the AMS 106 and receive additional code (e.g., JAVASCRIPT® or the like), which causes the content page 206 to load with an ad portion 210.

The ad portion 210 may include any element that allows information to be embedded within the content page 206. In some examples, the ad portion 210 may be implemented as an HTML element, such an I-Frame (inline frame) or other type of frame. The ad portion 210 may be hosted by the AMS 106 or the publisher 104 and may allow content (e.g., ads) from the AMS 106 or the publisher 104 to be embedded inside the content page 206. Parameters associated with the ad portion 210 (e.g., its size and shape) can be specified in the content page 206 (e.g., in HTML), so that the user access device 108 can present the content page 206 while the ad portion 210 is being loaded. Other implementations of ad portion 210 may also be used.

The ad portion 210 may send the AMS 106 formatting and content information 212. This information 212 may include information describing the manner (e.g., how, when, and/or where) in which ads can be rendered by the user access devices 108. The information 212 may also include ad attributes and parameters, such as size, shape, color, font, presentation style (e.g., audio, video, graphical, textual, etc.), etc. The information 212 may also specify a quantity of ads desired.

The formatting and content information 212 can include information associated with the requested content 208 displayed in content page 206. Such information may include a URL associated with the requested content page 206. The information 212 can include the requested content itself, a category corresponding to the requested publication or the content request, part or all of the content request 204, content age, content type (e.g., text, graphics, video, audio, mixed media, etc.), geo-location information, and the like.

In response to the information 212, the AMS 106 may provide the user access device 108 with ad information 214. The ad information 214 may include one or more ads 225 for placement in the ad portion 210 of the content page 206. The ad information 214 may also include a signed or encoded specification of an ad.

The ad information 214 may include ads that are relevant to user interest. The AMS 106 may retrieve and provide relevant ads based on the information 212 received from the user access device 108. The AMS 106 may retrieve the ad information 214 from the ad repository 136 using the backend processing systems 118. The AMS 106 may retrieve relevant ads using information from a crawling module, various keywords, various statistical associations between ads and publications, and/or preference information associated with the publishers.

The AMS 106 may decide whether to serve certain ads with publisher content based on the ad decision 202 received from the publisher 104. For example, the AMS 106 may identify a relevant ad from the ad repository 136 based on keywords but may decide that the ad should not be served with the publisher content (e.g., the requested automobile document) because the publisher 104 has indicated in the ad decisions 202 a disapproval of the identified ad. In some examples, these ad serving decisions may be based on rules maintained by the backend processing systems 118.

The ad portion 210 may populate with ads included in the ad information 214, such as ads 225. The ad portion 210 and the displayed ads 225 may occupy a portion of the content page 206, which may be distinct from other content (e.g., the requested content 208) in the content page 206.

When a user clicks on the displayed ad 225, an embedded code snippet may direct the user access device 108 to contact the AMS 106. During this event, the user access device 108 may receive an information parcel, such as a signed browser cookie, from the AMS 106. This information parcel can include information, such as an identifier of the selected ad 225, an identifier of the publisher 104, and the date/time the ad 225 was selected by the user. The information parcel may facilitate processing of conversion activities or other user transactions.

The user access device 108 may then be redirected to the content provider 102 associated with the selected ad 225. The user access device 108 may send a request 216 to the associated content provider 102 and then load a landing page 218 from the content provider 102. The user may then perform a conversion action at the landing page 218, such as purchasing a product or service, registering, joining a mailing list, etc. A code snippet 220, which may be provided by the AMS 106, may be included within a conversion confirmation page script, such as a script within a web page presented after the purchase. The user access device 108 may execute the code snippet 220, which may then contact the AMS 106 and report conversion data 222 to the AMS 106. The conversion data 222 may include conversion types and numbers as well as information from cookies. The conversion data 222 may be maintained in the conversion data repository 146.

FIG. 2 is an example only and not intended to be restrictive. Other data flows may therefore occur in the environment 100 and, even with the data flow 200, the illustrated events and their particular order in time may vary. Further, the illustrated events may overlap and/or may exist in fewer steps. Moreover, certain events may not be present and additional and/or different events may be included.

In alternative data flows, the AMS 106 can allow advertisers to approve publishers in a manner similar to the manner in which publishers approve advertisers. In such data flows, the AMS 106 can receive publisher decisions (i.e., decisions about publishers) from one or more content providers 102. The publisher decisions made by advertisers can include approvals and disapprovals of certain publishers. These approval/disapproval decisions can be based on aggregated scores, associated with publishers that are provided to advertisers. The aggregated scores can represent ratings of publishers received from multiple content providers 102. When providing relevant ads to the user access devices 108, the AMS 106 may take into account these publisher approvals/disapprovals. For example, the AMS 106 may decide to not provide an otherwise relevant ad to a given publisher based on the advertiser's disapproval of that publisher. Not providing a relevant ad to a publisher can include not bidding in an auction for publisher ad space.

In alternative data flows, the publisher 104 can send an ad request to the AMS 106 prior to sending a content page to the user access device 108. The AMS 106 may respond by sending relevant ads to the publisher 104. The publisher 104 may combine the received ads with requested publications in the publication page and then send the publication page, including the ad portion, to the user access device 108 for display to a user.

In alternative data flows, the AMS 106 may selectively recommend and provide ads to the user access devices 108 based on search terms provided by the user access devices 108. In these dataflows, the AMS 106 may provide searching services and receive search terms directly from the user access devices. The AMS 106 can also receive search terms from a dedicated searching system that receives user search requests. The AMS 106 may selectively recommend and provide ads to the user access devices based on the received search terms and ad keywords provided by the advertisers. Other modifications to the data flow 200 are also possible.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 3A:
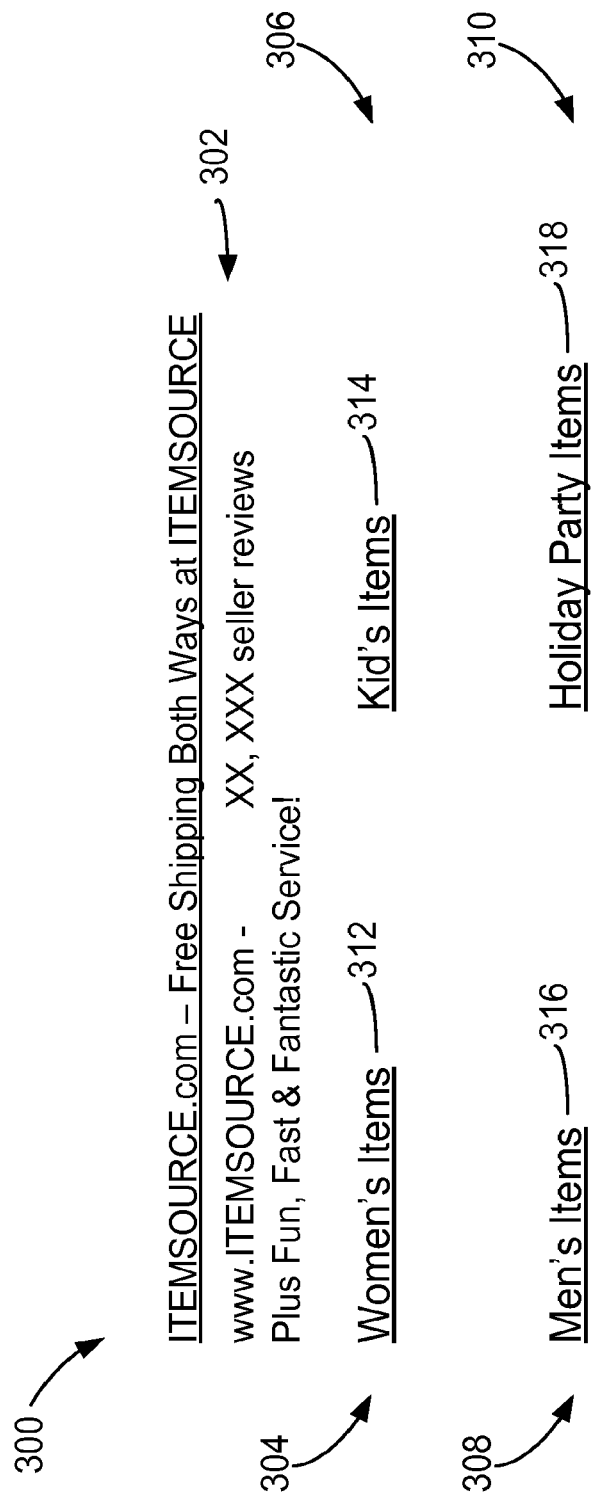
FIG. 3A is a sample screenshot showing representative search results arising from a search specified by a user.

FIG. 3A is a sample screenshot 300 showing representative search results arising from a search for "items" specified by a user 107. As described above, when a user 107 (shown in FIG. 1) performs an online search, an advertising system (such as AMS 106, also shown in FIG. 1) associated with the search provider will provide additional content in the form of one or more advertisements, to be presented to the user. For example, a search specified by user 107 may yield a primary result 302, which is a link to an advertiser-specified landing page. To supplement primary result 302, content provider 102 and/or AMS 106 provides several additional or secondary results 304-310. Each additional or secondary result displays a sitelink specified by a content provider 102 to appear in response to a specific user search inquiry. For example, result 304 includes sitelink 312, result 306 includes sitelink 314, result 308 includes sitelink 316, and result 310 includes sitelink 318. However, the texts appearing in sitelinks 312-318 alone may not contain sufficient information to enable a user to reach a decision whether to click on any of sitelinks 312-318.

Figure 3B:
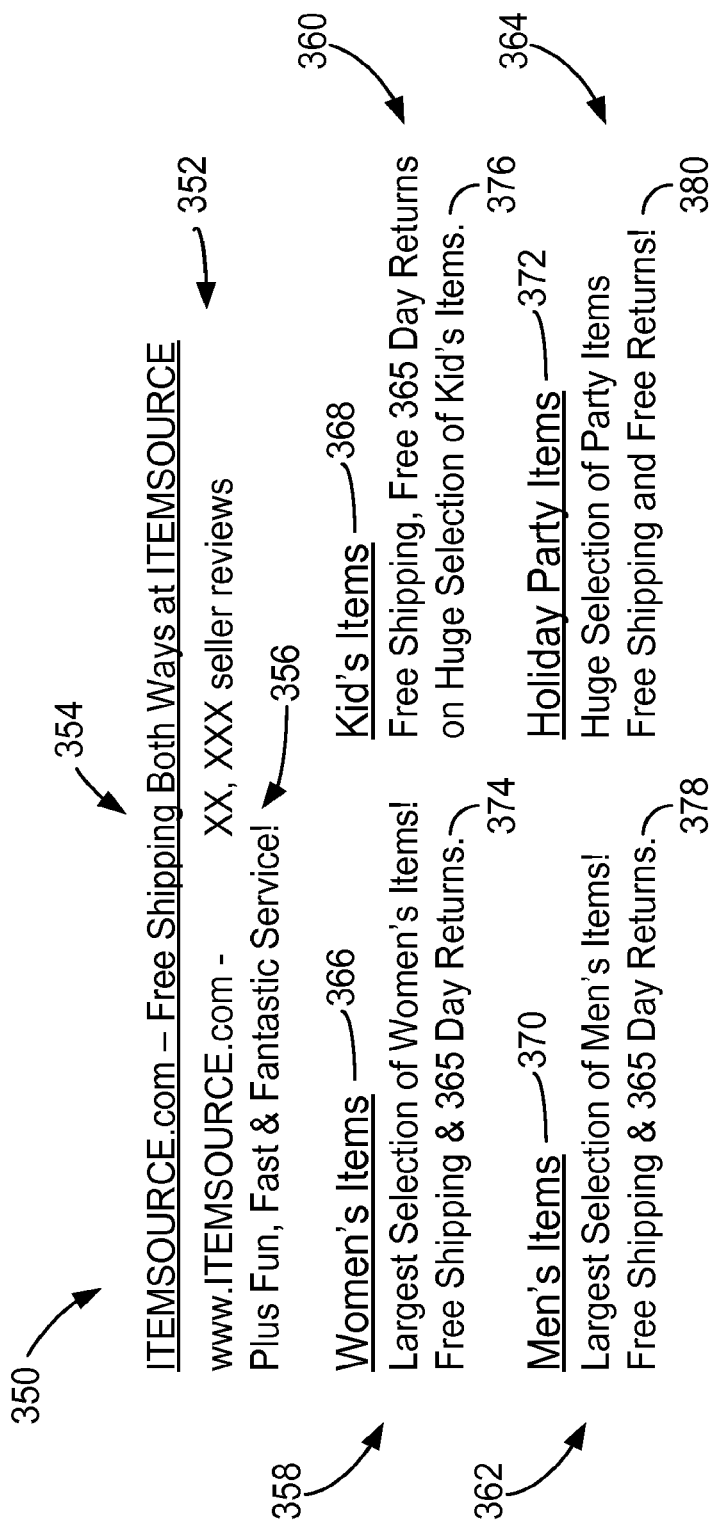
FIG. 3B is an example screenshot showing representative search results arising from a search specified by a user, in accordance with one embodiment of the present disclosure, in which additional or secondary sitelinks with associated creative texts are provided.

FIG. 3B is an example screenshot 350 according to the present disclosure, showing representative search results arising from a search for "items" specified by a user 107. A search specified by user 107 yields a primary result 352, which is a link to an advertiser-specified landing page. Primary result 352 includes a link 354, as well as a descriptive creative 356. In addition to primary result 352, the search may also yield several additional or secondary results 358-364 including sitelinks 366-372. Appearing with sitelinks 366-372 are descriptive texts (referred to as "creatives" or "creative texts"). For example, additional or secondary result 358 includes sitelink 366 and creative 374, result 360 includes sitelink 368 and creative 376, result 362 includes sitelink 370 and creative 378, and result 364 includes sitelink 372 and creative 380. AMS 106 attempts to provide the most relevant advertisements to user 107. A content provider 102 may have a plurality of landing pages, with associated URLs (forming additional or secondary results 358-364, for example), that are relevant to the search ordered by user 107. Each landing page (and associated URL) has one or more creative texts associated with it. These creative texts may also be associated with other landing pages (and URLs) within the advertiser website. Accordingly, AMS 106, in an example embodiment of the present disclosure, matches creatives with URLs so as to increase the relevance of the combined creative and URL to the search conducted by user 107.

Figure 4:
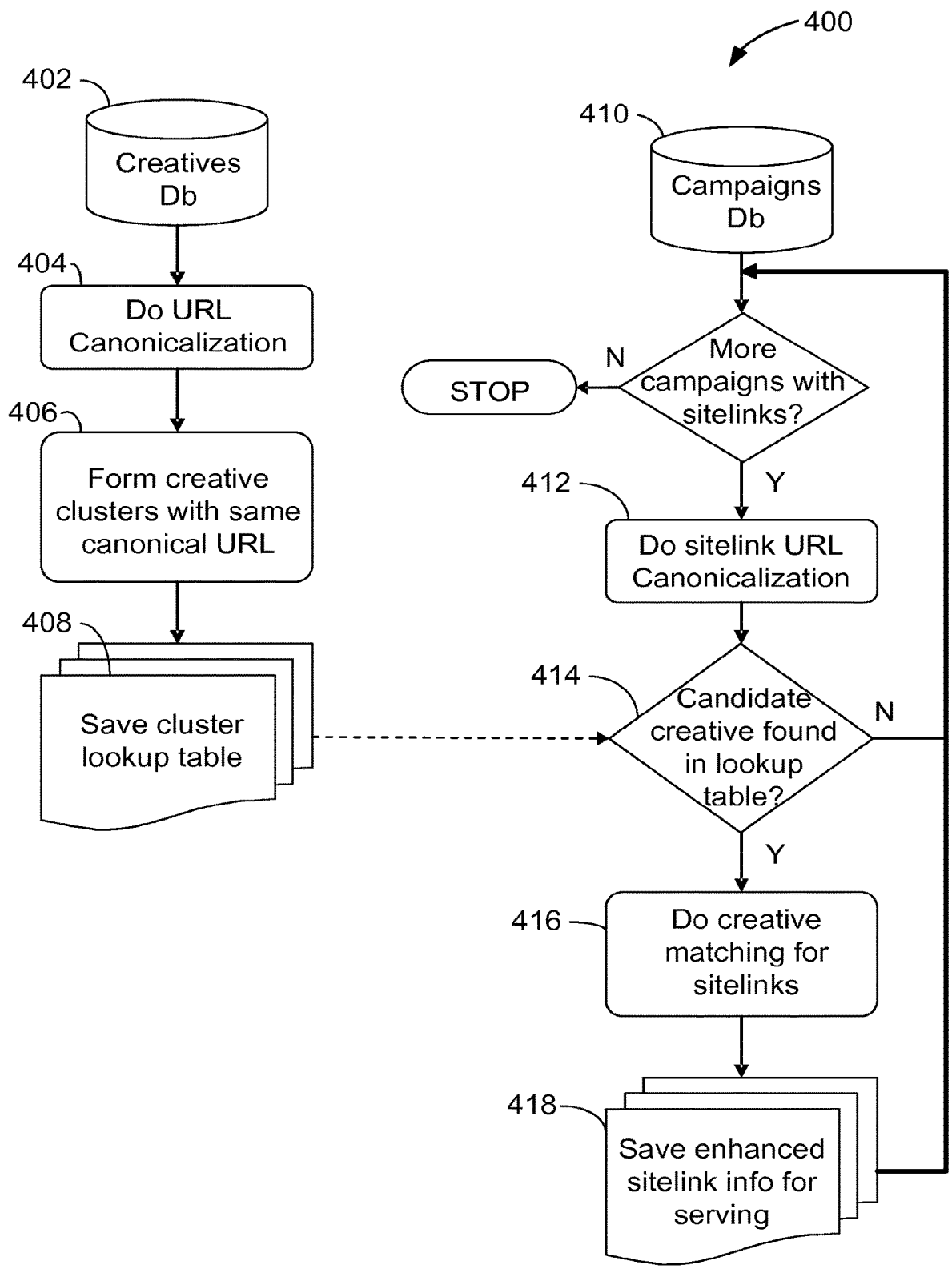
FIG. 4 is a flowchart of an example method for enhancing sitelinks with creative content.

FIG. 4 is a flowchart of an example method 400 for enhancing, for example, sitelink 312 with creative content, such as text 320 (shown in FIG. 3). Method 400 is described in the context of the results of a search performed by a user 107, which yields a primary result 302 (shown in FIG. 3), and a plurality of additional or secondary results (also referred to as the "extension"), although some of the steps such as the storing and/or canonicalization of creatives and/or sitelinks may be performed prior to a search by a user 107. As used herein, "canonicalization" refers to a process for converting data that has more than one possible representation into a "standard", "normal", or canonical form. This can be done to compare different representations for equivalence, to count the number of distinct data structures, to improve the efficiency of various algorithms by eliminating repeated calculations, or to make it possible to impose a meaningful sorting order. AMS 106 generates and stores 402 in a creatives database (which in an example embodiment is ad repository 136 shown in FIG. 1) a candidate set of creatives associated with each advertiser specified sitelink. Each sitelink has a URL associated with it, as does each creative. In one embodiment of the present disclosure, AMS 106 simply associates all creatives with the same URL as the sitelink as being part of a candidate set. In another example embodiment, AMS 106 canonicalizes 404 the creative URLs to identify characteristics of the URLs that will enable the creative URLs to be grouped into creative clusters. Canonicalization of creative-associated URLs may be accomplished through a variety of schemes, including analyzing landing pages associated with the sitelinks to compare the contents of the respective landing pages to identify significant similarities amongst the landing pages, wherein significant similarities are determined using one or more predefined rules or parameters. In an alternative scheme, canonicalization of creative-associated URLs includes crawling the creative-associated URL with and without a URL parameter associated with the creative-associated URL, comparing the landing pages, and removing the parameter from the creative-associated URL when the landing pages match. In addition, canonicalizing creative-associated URLs may include application of webmaster-supplied rules that indicate the relevance of URL parameters. After canonicalization, AMS 106 forms 406 creative clusters, such that creatives within a cluster share the same canonical URL. AMS 106 then saves 408 the clusters in a cluster lookup table.

AMS 106 stores data regarding advertising campaigns in campaign database or repository 150 (shown in FIG. 1). The campaign data includes sitelinks associated with various landing pages. Before matching sitelink URLs to creative URLs, sitelink URLs are canonicalized 412 to identify and account for advertiser redirects and other parameters in the URLs, used for recording and reporting site activity, that are otherwise inconsequential to directing a user to the final landing page associated with each URL. In one embodiment of a canonicalizaton scheme, AMS 106 identifies parameters in a link URL that are not important to identify a corresponding landing page by crawling the link URL with and without the parameter and then comparing the landing pages in each iteration for matches. Where landing pages match after crawling, the parameter is removed. In an embodiment, AMS 106 applies webmaster supplied rules as to relevance of URL parameters for landing page purposes. Following a user search, AMS 106 identifies a plurality of relevant sitelinks and refers 414 to the saved creative cluster lookup table for one or more clusters of candidate creatives to match to the specified sitelinks. In addition to, or as an alternative to associating sitelinks with ad campaigns, sitelinks may also be associated with other entities, such as ad groups.

Once a candidate set of creatives has been identified, in one embodiment, AMS 106 applies specific filter rules and/or policy checks related to the suitability of the creative for the specific sitelink, to eliminate matches of creatives to sitelinks that are expressly excluded, or simply inappropriate, relative to the search specified by user 107. Examples of filter rules or policy checks include demographic, geographic and language checks (to ensure that the creative is appropriate to user device location, for example), user device and/or platform rules, as well as checks to ensure that the candidate creatives are compatible with the status of the ad campaign. In another example embodiment, AMS 106 prunes the set of candidate creatives by performing deduping to remove redundancies and duplication between creatives found for a specific sitelink and by applying other policy checks such as the size of the available candidate set and estimated measures of the improvement to ad CTR ("click-through-rate"). After a set of candidate creatives for possible matching with a specified sitelink has been identified, AMS 106 performs creative matching 416. After a creative has been matched to a specified sitelink to create an enhanced sitelink, AMS 106 saves 418 data representing the enhanced sitelink, to be served to user 107.

Often, there can be several creative variants that could be matched with a given sitelink. In an example embodiment, AMS 106 performs creative matching by generating permutations of matches between one or more specified sitelinks and corresponding candidate creatives, and assigning scores to each permutation that reflects a relative value of the "fit" of each proposed match. The score may be based on various signals such as an impression score, which is a measure of how many times that creative was shown over a recent timeframe such as a week, and an IDF-score, which is a measure of similarity of terms between a sitelink text and a creative text.

In one embodiment, in which two or more sitelinks are being matched with two or more creatives, all applicable creatives that are associated with each candidate sitelink are ordered, based on impression count. As used herein, "impression count" refers to the number of times that an item, such as a creative, has been presented to online users. Then, each sitelink is matched with an as yet unmatched creative with the highest score. Remaining sitelinks are successively matched with the next highest scoring creatives, until all sitelinks are matched with creatives. Using such a methodology may result in the maximization of an individual match, at the expense of optimal matching of a group of sitelinks to a set of candidate creatives. Accordingly, in one embodiment, if using this methodology, a total match score is determined that is below a predefined threshold, AMS 106 uses a more globally optimal matching algorithm.

The globally optimal matching algorithm is implemented as follows. For example, two sitelinks S1 and S2 are to be provided to a user 107 in response to a search. Assume S1 can be matched to two (non-duplicative) creatives C1 and C2, having match scores of 10 and 8, respectively. Likewise, S2 can also be matched to C1 and C2, but with corresponding match scores of 8 and 2, respectively. In a matching scheme in which a first creative match score is optimized, the resulting association is S1-C1 and S2-C2 with an overall score of 12.

Figure 6:
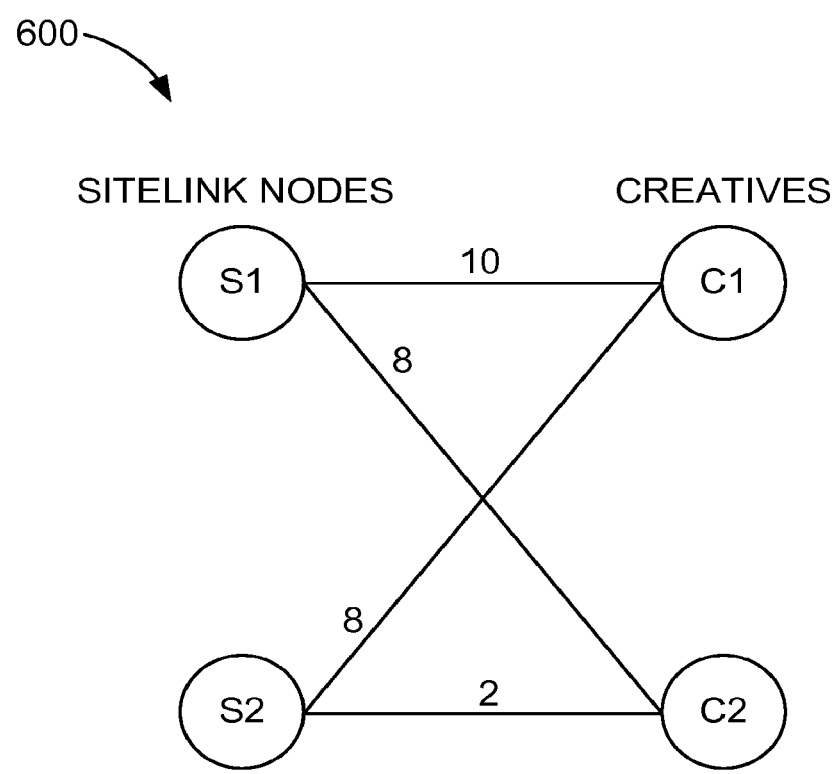
FIG. 6 is an example bipartite graph that may be used in matching sitelinks with creative content in accordance with one embodiment of the present disclosure.

FIG. 6 is an example bipartite graph 600 that may be used in matching sitelinks S1 and S2 with creatives C1 and C2. AMS 106 constructs bipartite graph 600 in which a set of specified sitelinks (S1, S2) constitutes one set of nodes and the creatives (C1, C2) in a candidate set form the other set of nodes. AMS 106 adds an edge (shown as a connecting line in graph 600) between a sitelink node and a creative to which it can be matched and the weight of the edge (the number adjacent the connecting line) is the match-score for the respective sitelink-creative pairing. AMS 106 performs a constrained maximal matching on this graph to obtain the overall best score subject to the constraint that there is no inter-sitelink creative duplication. Using the numerical values from the previous example, the bipartite matching scheme generates an improved matching of S1-C2 and S2-C1 with a total score of 16.

Specifically, in the alternative globally optimal matching methodology, a path growing heuristic is used, with additional modifications to avoid seed-bias, to provide match augmentation and to account for conflict resolution. Referring to the simplified example described above, the basic approach is to maintain two sets of paths obtained by alternatively performing 1) expansion from a sitelink to get its best remaining creative (e.g., the assignment S1-C2 provided above), with 2) expansion from a creative for its best remaining sitelink to which it can be assigned (e.g., the assignment S2-C1 provided above). The edges visited in each step get added to one of the two path-sets in alternating fashion. At each step, AMS 106 checks for duplicate creatives and/or redundant creatives (similar but not identically-duplicate creatives) from amongst the selected creatives, and rejects them. In addition, AMS 106 applies a predefined size constraint, in which matches that yield a score below a predefined threshold are discarded. If there are no choices available to grow a path from a certain node, AMS 106 restarts the process with the next sitelink that has not yet been explored. AMS 106 also does not revisit a sitelink or creative node.

Referring to the example described above, when all sitelink nodes have been explored, AMS 106 obtains two possible assignments, In one example, AMS 106 additionally attempts to 'augment' these assignments by checking if there are any unassigned sitelinks in each assignment. If unassigned sitelinks exist, they are matched with any available creatives that are eligible.

AMS 106 selects the assignment that has a higher score and meets the size constraint. The creative matching process, using the described algorithm, could yield different results based on the order in which sitelinks are initially arranged. This 'seed-bias' can be resolved by repeating the matching with different orders. When the number of sitelinks is a small number (6 or fewer), performing the necessary iterations of calculations to address all possible permutations is considered manageable. In one embodiment, AMS 106 may apply rules, applicable for example to more than 6 sitelinks, to define subsets in order to limit the number of permutations that are performed, to streamline the matching process.

Figure 7:
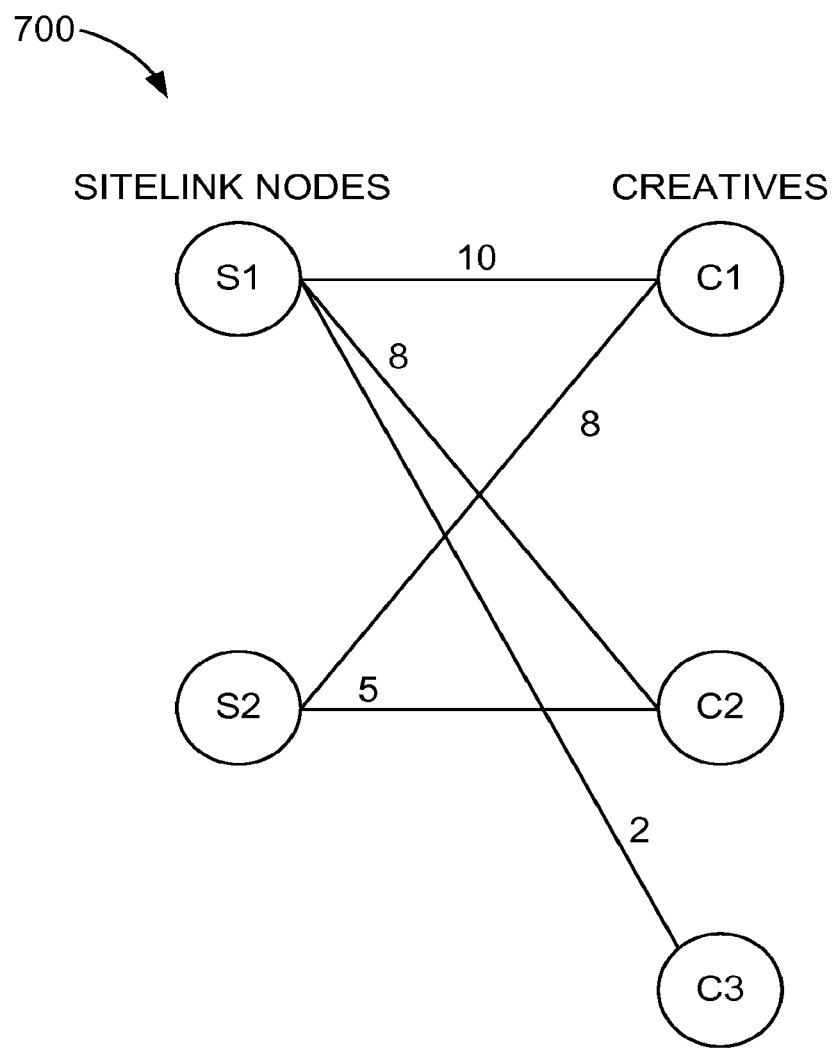
FIG. 7 is another example bipartite graph that may be used in matching sitelinks with creative content in accordance with one embodiment of the present disclosure.

FIG. 7 is another example bipartite graph 700 illustrating a slightly more complex scenario than that illustrated in FIG. 6. In the scenario of FIG. 7, sitelinks S1 and S2 can be potentially matched with creatives C1, C2 or C3. Specifically, S1 can be matched with C1, C2, and C3, with scores of 10, 8, and 5, respectively. Likewise, C2 can be matched with C1 and C2 with scores of 8 and 5, respectively. Because C1 and C2 can be matched with both of links S1 and S2, though not simultaneously, an optimal matching must take this constraint into consideration. Further, it is possible that C1 and C2 cannot both be part of the same matching as they may be deemed redundant to one another. In such a situation, an optimal matching would be S1-C3 and S2-C1.

In one embodiment, creatives may be ranked by metrics in addition to, or other than, impression count. Such an approach is desirable when a set of candidate creatives are not otherwise clearly differentiated by their respective impression counts. In addition, such an approach improves the quality of the results of the matching process by ensuring that the creatives shown in association with the selected sitelinks are related to the text in the sitelink. Accordingly, an additional scoring factor, referred to herein as an IDF score, is used. As used herein, "IDF" refers to "inverse-document-frequency," which refers to one of a number of known methodologies for analyzing term frequency within a document (or item of publication), while correcting for terms that are simply generally frequently encountered in a group of documents (or items of publication). Accordingly, a creative score is represented as:

$$\text{Creative Score} = w1 \times \text{Impression Score} + w2 \times \text{IDF Score},$$

where $0 \le w1 \le 1$ and $0 \le w2 \le 1$. When $w1=1$, and $w2=0$, only impression scores are counted. When $w1=0$ and $w2=1$, only IDF based scores are counted. In one embodiment, when performing IDF scoring, both sitelink text and creative text are normalized. As used herein, "normalized" means that terms are reduced to their stems, and stopwords (typically, short, functional words such as "the," "is," "at," "which," and "on") are removed. The IDF score is the weighted sum of words common to both a creative and an associated sitelink. In addition, IDF scoring may be performed in a uniform mode, in which no external influences are used, and all terms are given equal weight. Alternatively, in a non-uniform mode, different terms may be given different weights, based on external considerations. For example, the term "sale" may have a high IDF weight in a general corpus of text items, but may carry a lower weight in a corpus comprised of only creatives.

The foregoing detailed description illustrates embodiments of the disclosure by way of example and not by way of limitation. It is contemplated that the disclosure has general application to the review and revision of advertisements. It is further contemplated that the methods and systems described herein may be incorporated into existing online advertising planning systems, in addition to being maintained as a separate stand-alone application.

Figure 5:
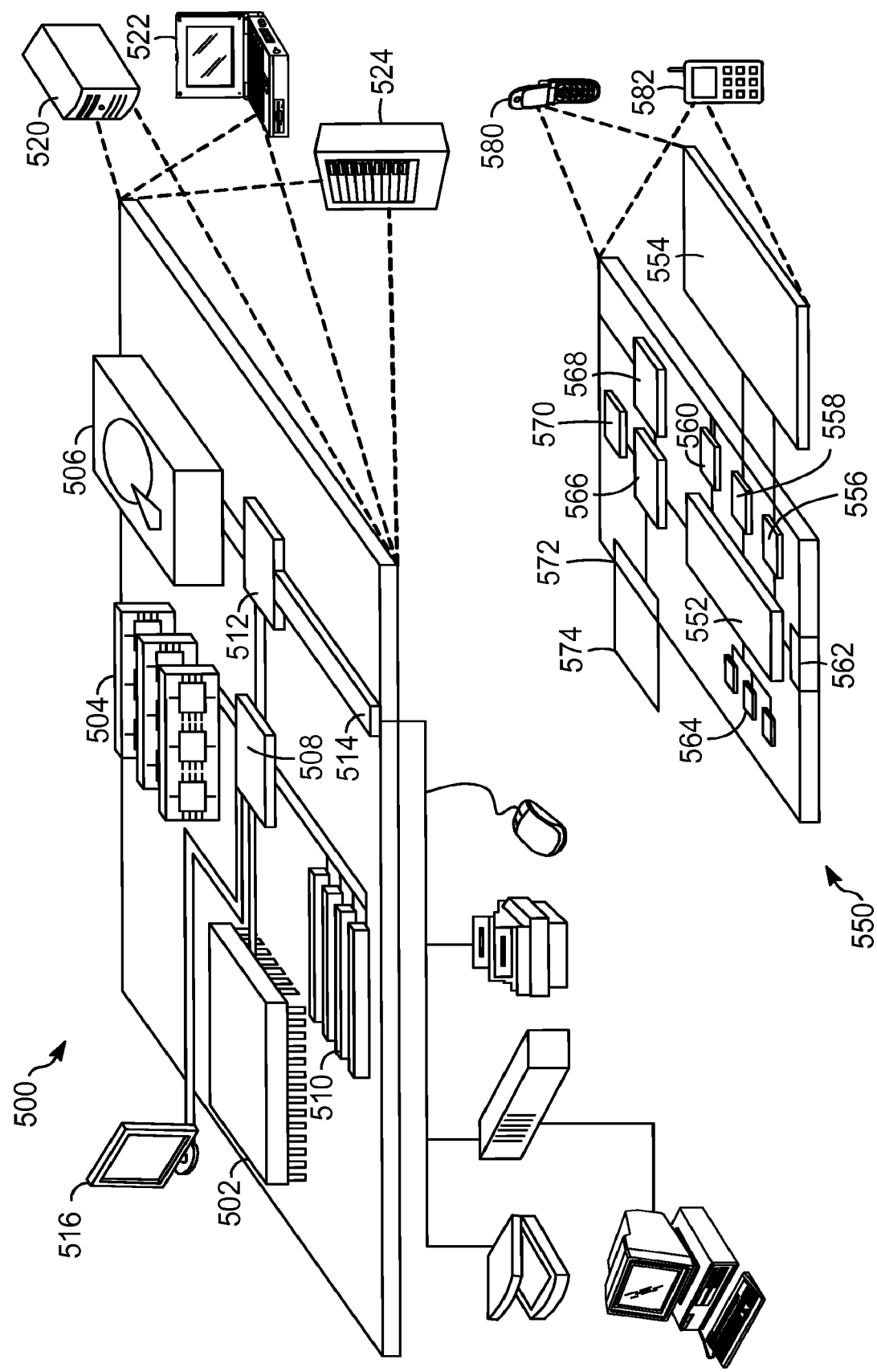
FIG. 5 is a diagram of example computing systems that may be used in the environment shown in FIG. 1 in accordance with one embodiment of the present disclosure.

FIG. 5 is a diagram of example computing devices 500 and 550 that may be used in the environment shown in FIG. 1. More specifically, FIG. 5 shows an example of a generic computing device 500 and a generic mobile computing device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be examples only, and are not meant to limit implementations of the disclosures described and/or claimed in this document.

Computing device 500 includes a processor 502, a memory 504, a storage device 506, a high-speed interface/controller 508 connecting to memory 504 and high-speed expansion ports 510, and a low speed interface/controller 512 connecting to a low speed bus 514 and storage device 506. Each of the components 502, 504, 506, 508, 510, and 512, are interconnected using various buses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed bus 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as computing device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The computing device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the computing device 550, such as control of user interfaces, applications run by computing device 550, and wireless communication by computing device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of computing device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to computing device 550 through expansion interface 572, which may include, for example, a SIMM (Single In Line Memory Module) card interface. Such expansion memory 574 may provide extra storage space for computing device 550, or may also store applications or other information for computing device 550. Specifically, expansion memory 574 may include instructions to carry out or supplement the processes described above, and may include secure information also. Thus, for example, expansion memory 574 may be provide as a security module for computing device 550, and may be programmed with instructions that permit secure use of computing device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Computing device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning system) receiver module 570 may provide additional navigation- and location-related wireless data to computing device 550, which may be used as appropriate by applications running on computing device 550.

Computing device 550 may also communicate audibly using audio codec 560, which may receive spoken information from a user and convert it to usable digital information. Audio codec 560 may likewise generate audible sound for a user, such as through a speaker, e.g., in a handset of computing device 550. Such sound may include sound from voice telephone calls, may include recorded sound (e.g., voice messages, music files, etc.) and may also include sound generated by applications operating on computing device 550.

The computing device 550 may be implemented in a number of different forms, as shown in the figure. For example, it may be implemented as a cellular telephone 580. It may also be implemented as part of a smart phone 582, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing systems 500 and 550 are configured to receive and/or retrieve data pertaining to the creation, review and revision of online advertisements; data regarding advertisers, advertising links or impressions corresponding to those advertisers that appear on a web page, and metrics corresponding to the appearance of those impressions on that web page, etc., from various other computing devices connected to computing devices 500 and 550 through a communication network, and store this data within at least one of memory 504, storage device 506, and memory 564. Computing systems 500 and 550 are further configured to manage and organize the data within at least one of memory 504, storage device 506, and memory 564 using the techniques described herein.

The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the disclosure or its features may have different names, formats, or protocols. Further, the system may be implemented via a combination of hardware and software, as described, or entirely in hardware elements. Also, the particular division of functionality between the various system components described herein is merely one example, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A system for canonicalized online document sitelink generation, comprising:
   a data processing system comprising at least one processor and memory to:
      receive digital information generated by an audio codec that converts spoken information from a user to the digital information;
      identify, based on the digital information, a content item associated with a first uniform resource locator (URL) including a campaign parameter;
      generate a canonicalized content item URL comprising a canonical form by removing the campaign parameter from the first URL;
      generate a content item URL group with the canonicalized content item URL;
      receive a sitelink associated with a second URL indexed in a database, the second URL including a URL parameter;
      crawl the second URL with the URL parameter to identify a landing page;
      crawl the second URL without the URL parameter to identify the same landing page;
      generate, responsive to crawl of the second URL with and without the URL parameter and identification of the same landing page, a canonicalized sitelink URL for the second URL by removal of the URL parameter, wherein the canonicalized content item URL is in the canonical form configured to reduce repeated calculations as compared to the first URL not in the canonical form;
      match the canonicalized sitelink URL with the content item of the content item URL group based on an indication of similarity between text of the content item and text of the canonicalized sitelink URL;
      determine, based on a filter configured to eliminate excluded content items based on a geographic policy, that the content item is compatible with the canonicalized sitelink URL; and
      select, in response to receipt of the digital information generated by the audio codec that converts the spoken information from the user to the digital information, the content item matched with the sitelink associated with the canonicalized sitelink URL based on the filter.

2. The system of claim 1, comprising the data processing system to:
   receive the digital information from a first device via a computer network, the first device configured with the audio codec that converts the spoken information from the user to the digital information; and
   transmit, to a second device via the computer network, the content item selected based on the match with the sitelink associated with the canonicalized sitelink URL.

3. The system of claim 1, comprising the data processing system to:
   prune a candidate set of content items matched with sitelinks by removal of at least one of duplicate content items and redundant content items.

4. The system of claim 1, comprising the data processing system to:
   select the content item matched with the sitelink associated with the canonicalized sitelink URL based on filter rules, the filter rules comprising at least one of language rules, geographic rules, user device rules, platform rules, and campaign rules.

5. The system of claim 1, comprising the data processing system to:
   index a plurality of sitelink URLs with and without a URL parameter associated with each of the plurality of sitelink URLS;
   compare landing pages of each of the plurality of sitelink URLs; and
   remove the URL parameter from each of the plurality of sitelink URLs responsive to a determination that the landing pages of each of the plurality of sitelinks match, the removal of the URL parameter.

6. The system of claim 1, comprising the data processing system to:
   generate the canonicalized sitelink URL with webmaster supplied rules that specify a relevance of the URL parameter; and
   generate the canonicalized content item URL with the webmaster supplied rules that indicate a relevance of the campaign parameter.

7. The system of claim 1, comprising the data processing system to:
   generate the canonicalized content item URL based on a comparison of contents of a first landing page associated with the canonicalized content item URL to identify one or more similarities with a second landing page associated with a second canonicalized content item URL.

8. The system of claim 1, comprising the data processing system to:
   select the content item based on a match between a plurality of sitelinks with an as-yet unmatched content item having a highest estimated score from amongst unmatched content items.

9. The system of claim 1, wherein the campaign parameter includes at least one of an identifier, name, type, size, first line, web address, display URL, and media type.

10. A method of canonicalized online document sitelink generation, comprising:
    receiving, by a data processing system comprising at least one processor and memory, digital information generated by an audio codec that converts spoken information from a user to the digital information;

identifying, by the data processing system, based on the digital information, a content item associated with a first uniform resource locator (URL) including a campaign parameter;

generating, by the data processing system, the first URL into a canonicalized content item URL comprising a canonical form by removing the campaign parameter from the first URL;

generating, by the data processing system, a content item URL group with the canonicalized content item URL;

receiving, by the data processing system, a sitelink associated with a second URL indexed in a database, the second URL including a URL parameter;

crawling the second URL with the URL parameter to identify a landing page;

crawling the second URL without the URL parameter to identify the same landing page;

generating, by the data processing system responsive to crawling the second URL with and without the URL parameter and identifying the same landing page, a canonicalized sitelink URL for the second URL by removing the URL parameter, wherein the canonicalized content item URL is in the canonical form configured to reduce repeated calculations as compared to the first URL not in the canonical form;

matching, by the data processing system, the canonicalized sitelink URL with the content item of the content item URL group based on an indication of similarity between text of the content item and text of the canonicalized sitelink URL;

determining, by the data processing system, based on a filter configured to eliminate excluded content items based on a geographic policy, that the content item is compatible with the canonicalized sitelink URL; and selecting, by the data processing system in response to receipt of the digital information generated by the audio codec that converts the spoken information from the user to the digital information, the content item matched with the sitelink associated with the canonicalized sitelink URL based on the filter.

11. The method of claim 10, comprising:

receiving the digital information from a first device via a computer network, the first device configured with the audio codec that converts the spoken information from the user to the digital information; and transmitting, to a second device via the computer network, the content item selected based on the match with the sitelink associated with the canonicalized sitelink URL.

12. The method of claim 10, comprising:

pruning a candidate set of content items matched with sitelinks by removal of at least one of duplicate content items and redundant content items.

13. The method of claim 10, comprising selecting the content item matched with the sitelink associated with the canonicalized sitelink URL based on filter rules, the filter rules comprising at least one of language rules, geographic rules, user device rules, platform rules, and campaign rules.

14. The method of claim 10, comprising:

indexing a plurality of sitelink URLs with and without a URL parameter associated with each of the plurality of sitelink URLS;

comparing landing pages of each of the plurality of sitelink URLs; and removing the URL parameter from each of the plurality of sitelink URLs responsive to a determination that the landing pages of each of the plurality of sitelinks match.

15. The method of claim 10, comprising:

generating the canonicalized sitelink URL with webmaster supplied rules that specify a relevance of the URL parameter; and generating the canonicalized content item URL with the webmaster supplied rules that indicate a relevance of the campaign parameter.

16. The method of claim 10, comprising:

generating the canonicalized content item URL based on a comparison of contents of a first landing page associated with the canonicalized content item URL to identify one or more similarities with a second landing page associated with a second canonicalized content item URL.

17. The method of claim 10, comprising:

selecting the content item based on a match between a plurality of sitelinks with an as-yet unmatched content item having a highest estimated score from amongst unmatched content items.

18. The method of claim 10, wherein the campaign parameter includes at least one of an identifier, name, type, size, first line, web address, display URL, and media type.

* * * * *